(12) United States Patent
Bassin et al.

(10) Patent No.: US 12,455,612 B2
(45) Date of Patent: Oct. 28, 2025

(54) DEVICE, METHOD AND SYSTEM TO PROVIDE THREAD SCHEDULING HINTS TO A SOFTWARE PROCESS

(71) Applicant: Intel Corporation, Santa Clara, CA (US)

(72) Inventors: Vadim Bassin, Raanana (IL); Eliezer Weissmann, Haifa (IL); Efraim Rotem, Haifa (IL); Julius Mandelblat, Haifa (IL)

(73) Assignee: Intel Corporation, Santa Clara, CA (US)

( * ) Notice: Subject to any disclaimer, the term of this patent is extended or adjusted under 35 U.S.C. 154(b) by 827 days.

(21) Appl. No.: 17/374,728

(22) Filed: Jul. 13, 2021

(65) Prior Publication Data
US 2023/0018828 A1    Jan. 19, 2023

(51) Int. Cl.
*G06F 1/3293* (2019.01)
*G06F 1/3228* (2019.01)
*G06F 9/48* (2006.01)

(52) U.S. Cl.
CPC .......... *G06F 1/3293* (2013.01); *G06F 1/3228* (2013.01); *G06F 9/4887* (2013.01)

(58) Field of Classification Search
CPC ..... G06F 1/3293; G06F 1/3228; G06F 9/4887
See application file for complete search history.

(56) References Cited

U.S. PATENT DOCUMENTS

| | | |
|---|---|---|
| 9,164,573 B2 | 10/2015 | Boom et al. |
| 9,329,900 B2 | 5/2016 | Narvaez et al. |
| 9,424,092 B2 | 8/2016 | Singh et al. |
| 9,672,046 B2 | 6/2017 | Subbareddy et al. |
| 9,720,730 B2 | 8/2017 | Ginzburg et al. |
| 9,996,135 B2 | 6/2018 | Wells et al. |
| 10,185,566 B2 | 1/2019 | Naveh et al. |
| 10,733,017 B2 | 8/2020 | Kim et al. |

(Continued)

FOREIGN PATENT DOCUMENTS

TW    201716989 A    5/2017

OTHER PUBLICATIONS

Office Action from European Patent Application No. 22166196.0 notified Aug. 9, 2023, 7 pgs.

(Continued)

*Primary Examiner* — Kim Huynh
*Assistant Examiner* — Cole Jiawei Wentzel
(74) *Attorney, Agent, or Firm* — Essential Patents Group, LLP

(57) ABSTRACT

Techniques and mechanisms for providing a thread scheduling hint to an operating system of a processor which comprises first cores and second cores. In an embodiment, the first cores are of a first type which corresponds to a first range of sizes, and the second cores are of a second type which corresponds to a second range of sizes smaller than the first range of sizes. A power control unit (PCU) of the processor is to detect that an inefficiency, of a first operational mode of the processor, would exist while an indication of an amount of power, to be available to the processor, is below a threshold. Based on the detecting, the PCU hints to an executing software process that a given core is to be included in, or omitted from, a pool of cores available for thread scheduling.

20 Claims, 16 Drawing Sheets

(56) References Cited

U.S. PATENT DOCUMENTS

| | | | |
|---|---|---|---|
| 2010/0037038 A1* | 2/2010 | Bieswanger | G06F 9/5094 |
| | | | 713/300 |
| 2012/0117403 A1* | 5/2012 | Bieswanger | G06F 1/324 |
| | | | 713/322 |
| 2013/0339771 A1* | 12/2013 | Ryu | G06F 9/5094 |
| | | | 713/323 |
| 2014/0026146 A1 | 1/2014 | Jahagirdar et al. | |
| 2014/0181830 A1 | 6/2014 | Naik et al. | |
| 2016/0092274 A1* | 3/2016 | Singh | G06F 9/5027 |
| | | | 718/104 |
| 2018/0067533 A1 | 3/2018 | Ardanaz et al. | |
| 2018/0129534 A1 | 5/2018 | Iyigun et al. | |
| 2018/0275742 A1 | 9/2018 | Seol et al. | |
| 2019/0065242 A1 | 2/2019 | Therien et al. | |

OTHER PUBLICATIONS

Extended European Search Report from European Patent Application No. 22166196.0 notified Sep. 2, 2022, 8 pgs.
Notice of Allowance from European Patent Application No. 22166196.0 notified Nov. 14, 2024, 11 pgs.
Office Action from Taiwanese Patent Application No. 111110100 notified Jul. 16, 2025, 16 pgs.

* cited by examiner

600

| | |
|---|---|
| N | total number of cores |
| c(i) | ith core, where i ∈ {0,..., (N-1)} |
| m | number of small cores |
| | c(0),..., c(m-1)   small cores |
| | c(m),..., c(N-1)   large cores |
| x | the number of currently active cores |
| | c(x-1) the next active core subject to being deactivated |
| | c(x)   the next inactive core subject to being activated |
| fc | operational frequency of active core(s) |
| Vcc_min | minimum supply voltage level for active core(s) |
| Fmax[Vcc_min] | most efficient core frequency Fmax for operation at Vcc_min |

```
While (one or more threads to be executed)
    If fc < Fmax[Vcc_min]   //test if thread consolidation could improve power efficiency
        If x > 1            //test whether extra core(s) available for deactivation
            hint to OS that c(x-1) is to be removed from thread scheduling (and deactivated)
            pause 1 sec     // delay to allow system settling before next evaluation
            If c(x-1) inactive
                x--         //decrement count of active cores
    Else if (fc > Fmax[Vcc_min]) AND (hysteresis breaking condition)
        hint to OS that all cores are to be available for thread scheduling (and active)
        pause 1 sec         // delay to allow for system settling before any next evaluation
        If all cores activate
            x = N           //set core index value to maximum value
    Else if (fc > Fmax[Vcc_min]) AND (hysteresis condition met)
        hint to OS that c(x) is to be added to thread scheduling (and activated)
        pause 100 msec      // delay to allow for system settling before any next evaluation
        If c(x) active
            x++             //increment count of active cores
```

FIG. 6

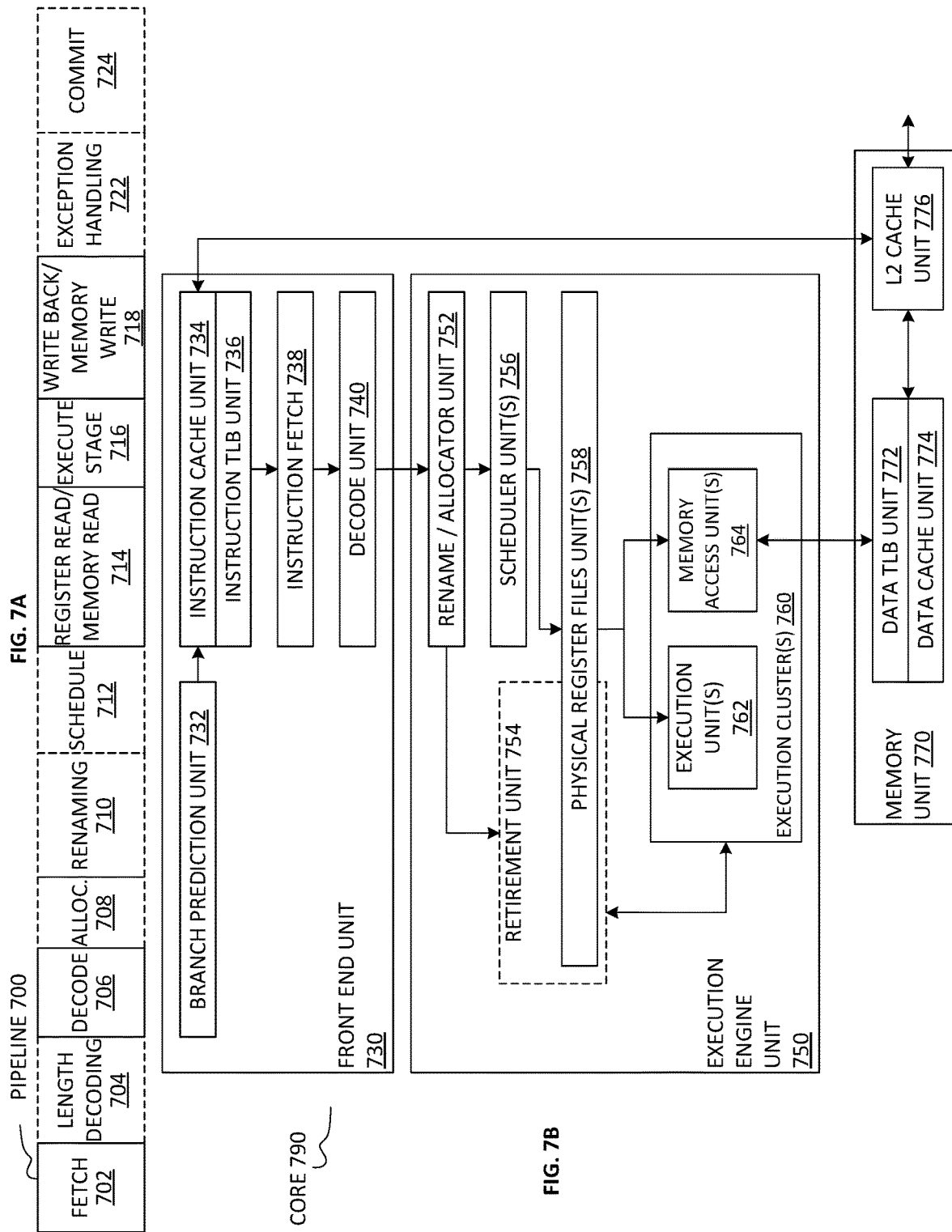

DEVICE, METHOD AND SYSTEM TO PROVIDE THREAD SCHEDULING HINTS TO A SOFTWARE PROCESS

BACKGROUND

1. Technical Field

This disclosure generally relates to processor architectures and more particularly, but not exclusively, to techniques for determining a combination of processor cores to execute one or more threads.

2. Background Art

Advances in semiconductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a processor on a single die which includes any number of processing elements, such as cores, threads, and/or logical processors.

A multi-processor system, such as a chip multiprocessor ("CMP") system, comprises multiple processor cores, each of which is capable of independently executing a thread. A homogenous CMP system comprises processor cores that all have some same one or more characteristics instruction, such as a same size, a same instruction set architecture (ISA), or the like. In many cases, if power is a main design constraint, an all small processor core system tends to be a preferable choice. However, such a system will usually suffer from lower performance capabilities, as compared to an all big processor core system. A natural extension to an all small processor core system is to have an additional big processor core(s) to provide for the additional boost in performance when needed, while leveraging the power efficient small processor cores for some types of system execution.

Currently, power control of multi-thread workloads is typically done using the scaling of the operational frequency and/or the voltage of a processor. As successive generations of processor architectures continue to scale in size, and capability, there is expected to be an increasing premium placed on improvements to the power efficiency of such architectures.

BRIEF DESCRIPTION OF THE DRAWINGS

The various embodiments of the present invention are illustrated by way of example, and not by way of limitation, in the figures of the accompanying drawings and in which:

FIG. 6 shows pseudocode illustrating features of a process to provide thread scheduling information to an executing process according to an embodiment.

FIG. 7A is a block diagram illustrating both an exemplary in-order pipeline and an exemplary register renaming, out-of-order issue/execution pipeline according to embodiments of the invention.

FIG. 7B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
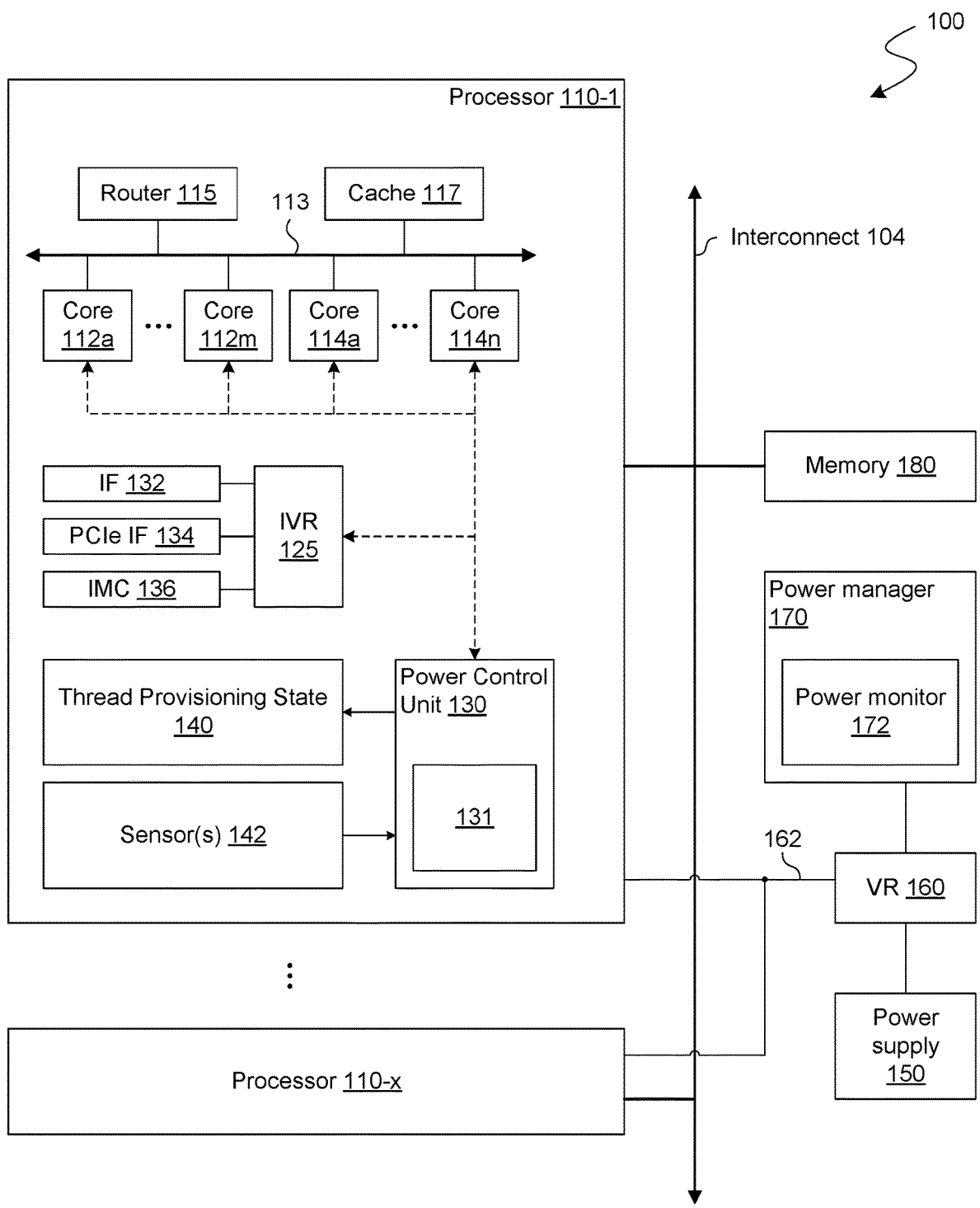
FIG. 1 shows a block diagram illustrating features of a system to facilitate a scheduling of threads by a processor according to an embodiment.

Embodiments discussed herein variously provide techniques and mechanisms for providing a hint to an executing software process as to whether a given core is to be included in, or excluded from, a scheduling of threads. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a power control unit.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some embodiments variously facilitate improved multithreaded performance of a processor which comprises heterogenous cores (that is, processor cores of different respective types)—e.g., the performance while some or all such cores are operating on limited power. Generally, relatively small processor cores (as compared to larger cores) exhibit better power efficiency and performance in lower power operating points. Various embodiments described herein provide for better efficiency of multithreaded workloads when, for example, it is determined that some or all heterogenous cores of a processor are operating at an inefficient frequency point for a given level of a supply voltage. For example, some embodiments, in response to an indication of a decrease in available power, consolidate threads to fewer cores—e.g., wherein larger cores are prioritized over smaller cores for selective deactivation after the consolidation. Alternatively or in addition, in response to an indication of an increase in available power, some embodiments reallocate threads among a greater number of cores—e.g., wherein smaller cores are prioritized over larger cores for use in executing reallocated threads.

Certain features of various embodiments are described herein with reference to the providing of a signal which hints to an operating system that a given processor core is to be included in (or alternatively, to be omitted from) a pool of cores which are to be available for thread scheduling. However, it is to be appreciated that such description can be extended to embodiments which, additionally or alternatively, provide such a hint to any of various other software processes which determine the inclusion or exclusion of a given core from thread scheduling (and/or determine a particular operational mode of the processor, for example). By way of illustration and not limitation, some embodiments provide hint information to any of various suitable system drivers, virtual machines, hypervisors, software container processes, or the like.

FIG. 1 shows features of a system 100 to facilitate a scheduling of threads by a processor according to an embodiment. System 100 illustrates one example of an embodiment wherein a power control unit is configured to hint to an executing software process that a processor core is to be included in—or alternatively, omitted from—thread scheduling. In some embodiments, the hint is based on an indication that power available to a processor is to be below a threshold level, and further based on a relative prioritization of a first type of processor cores with respect to the second type of processor cores. In various embodiments, system 100 is or otherwise includes a system-on-chip (SOC), for example. Additionally or alternatively, a packaged device includes system 100, in some embodiments.

System 100 illustrates an embodiment wherein a power control unit (PCU) provides functionality to detect an inefficiency of some first operational mode of the processor. The detecting of the inefficiency is based, for example, on an indication of an amount of power which is currently available (or alternatively, expected to become available) to the processor. In some embodiments, the indication only indirectly signifies the amount of available power—e.g., wherein the indication comprises an operational frequency of the processor, or a level of a voltage supplied to the processor. In various embodiments, the PCU detects that the inefficiency exists (or would exist) while the indication is below some predetermined threshold—e.g., where the inefficiency would exist if the processor were to remain in the first operational mode after the indication has transitioned to below the threshold. Based on the detected inefficiency, the PCU provides a signal to hint to an OS (or other suitable software process executed with the processor) that a core is to be included in, or omitted from, thread scheduling. Based on the hint, the OS (or other such executing process) conditionally adapts thread scheduling—e.g., to facilitate a transition of the processor to a more efficient operational mode.

As shown in FIG. 1, system 100 includes one or more processors (such as the illustrative processors 110-1, . . . , 110-x shown, which are generally referred to herein as "processors 110" or "processor 110"). The one or more processors 110 are coupled to communicate via a bus or other interconnect 104. Some or all of the one or more processors each include respective power control circuitry to provide functionality, according to an embodiment, which is only discussed with reference to processor 110-1 for clarity. Accordingly, some or all remaining processors include power control circuitry the same as, or similar to, that discussed with reference to processor 110-1.

Processor 110-1 includes multiple processor cores (such as the illustrative one or more cores 112, and one or more cores 114 shown), and—for example—one or more shared and/or private caches (such as cache 117), buses or interconnections (such as a bus or other interconnect 113), graphics and/or memory controllers, or other components. In one example embodiment, a router 115 is used to communicate between various components of the processor 110-1 and/or system 100. In various embodiments, the processor 110-1 includes more than one router 115—e.g., wherein a multitude of routers 115 are in communication to enable data routing between various components inside or outside of the processor 110-1.

The cache 117 stores data—e.g., including instructions—that are utilized by one or more components of the processor 110-1 (such as the illustrative one or more cores 112, and one or more cores 114 shown). For example, the cache 117 locally caches data stored in a memory 180 for faster access by the components of the processor 110 (e.g., faster access by cores 112, 114). As shown in FIG. 1, the memory 180 communicates with the processors 110 via the interconnect 104. In an embodiment, the cache 117 (that is shared) is a mid-level cache (MLC), a last level cache (LLC), etc. Also, each of cores 112, 114 includes a level 1 (L1) cache or other levels of cache such as a level 2 (L2) cache. Moreover, various components of the processor 110-1 communicate with the cache 117 directly, through a bus (e.g., the interconnect 113), and/or a memory controller or hub.

Still referring to FIG. 1, additional components of processor 110-1 include (for example) an input/output interface 132, another interface 134, and an integrated memory controller (IMC) 136. As seen, each of these components is powered, for example, by an integrated voltage regulator IVR 125. In one embodiment, interface 132 enables operation for an Intel® Quick Path Interconnect (QPI) interconnect, which provides for point-to-point (PtP) links in a cache coherent protocol that includes multiple layers including a physical layer, a link layer and a protocol layer. In turn, interface 134 communicates via a Peripheral Component Interconnect Express (PCIe™) protocol. In various embodiments, processor 110-1 omits some or all of IF 132, PCIe IF 134, IMC 136, or IVR 125, and/or includes additional or alternative components which (for example) are adapted from conventional processor architectures.

System 100 also includes (or alternatively, is configured to be coupled to) a power supply 150—e.g., a direct current (DC) power source or an alternating current (AC) power source—which is to provide power to one or more components of the system 100. In some embodiments, power supply 150 includes one or more battery packs. By way of illustration and not limitation, power supply 150 is coupled to components of system 100 through a voltage regulator (VR) 160. In one such embodiment, some or all of processors 110 are variously coupled to power supply 150 via an external voltage regulator 160, which (for example) performs a voltage conversion to provide a primary regulated voltage to processor 110.

System 100 further includes (or alternatively, is configured to couple to) a power manager 170 which, for example, is implemented with fixed functionality hardware, microcode, firmware, software, or any combination thereof. In various embodiments, some functionality of power manager 170 is included in or executed by a processor 110—e.g., wherein one or more cores of said processor 110 are configured to implement power manager 170.

In some embodiments, power manager 170 includes control logic to perform various operations which, for example, are adapted from conventional power management techniques—e.g., wherein power manager 170 includes, has access to, or otherwise operates based on one or more predetermined power management policies according to which one or more supply voltages (e.g., including the illustrative supply voltage 162 shown) are to be provided to some or all of processors 110. For example, a power monitor 172 of power manager 170 provides functionality to monitor a power state of system 100—e.g., wherein power monitor 172 is configured to receive, generate or otherwise determine information which specifies or otherwise indicates one or more characteristics of a power delivery, one or more power requirements, and/or the like. In one such embodiment, power monitor 172 is coupled to receive from various components of system 100 one or more signals which specify or otherwise indicate an actual condition of the power state, and/or a condition of an expected future power state. In this particular context, it is understood that "condition of a power state" may include (for example) a rate of change—e.g., first order, second order, or the like—of a condition. Based on the power state information determined with power monitor 172—and, for example, based a predetermined power management policy—power manager 170 signals VR 160 to regulate a level and/or other characteristic of one or more supply voltages.

Even though FIG. 1 illustrates one power supply 150 and one voltage regulator 160, additional power sources and/or voltage regulators are utilized in some embodiments. For example, in some embodiments, different ones of the processors 110 each correspond to a different respective voltage regulator(s) and/or power source(s). Alternatively or in addition, one or more voltage regulators are coupled to a single power plane (e.g., supplying power to some or all cores of processors 110) or to multiple power planes (e.g., where each power plane supplies power to a different core or group of cores). Additionally, while FIG. 1 illustrates the power supply 150 and the voltage regulator 160 as separate components, in other embodiments, the power supply 150 and the voltage regulator 160 are incorporated into other components of system 100. For example, all or portions of the VR 160 are alternatively incorporated into the power supply 150 and/or processor 110.

Some or all of processors 110 each include respective circuit resources which are variously coupled each to receive a respective supply voltage to enable the execution of various software threads. In the example embodiment shown, processor 110-1 illustrates one example of a processor which comprise what is referred to herein as "heterogeneous cores"—i.e., multiple cores which include cores of different respective types (referred to herein as "core types").

Some embodiments variously provide power control functionality to accommodate the different respective power and performance characteristics of various core types—e.g., including different respective classes of power requirements, different respective classes of power efficiency, or the like. In some embodiments, a first core type corresponds to a first level of power consumption, wherein a second core type corresponds to a second level of power consumption which is different than the first level. For example, any core of the first core type supports a maximum power consumption which is at the first level (or is in a first range including the first level), wherein any core of the second core type supports a maximum power consumption which is at the second level (or is in a second range including the second level) that is less than, or otherwise differs from, the first level (or the first range).

The variety of such power and performance characteristics between core types corresponds, for example, to different respective sizes (or ranges of sizes) associated with the core types—e.g., wherein any core of one core type is within a first range of sizes, and any core of another core type is within a second range of sizes which does not overlap the first range of sizes. In this context, "size" is to be determined, for example, with respect to a core's physical area, to a number of active circuit elements (e.g., including transistors, logic gates, or the like), and/or to any of various other suitable physical characteristics known in the art.

By way of illustration and not limitation, a first core type is associated with a first one or more ranges of values, each for a respective one of a physical characteristic (e.g., including a dimension, area, or count of circuit elements), a power requirement, a power constraint, or the like—e.g., wherein the first one or more ranges of values pertain to one or more cores provided the Core™ brand of processors manufactured by Intel Corporation of Santa Clara, Calif., USA. In one such embodiment, a second core type is similarly associated with a second one or more ranges of values—e.g., wherein the second one or more range of values pertain to one or more cores provided the Atom™ brand of processors manufactured by Intel Corporation of Santa Clara, Calif., USA. However, such core types are merely exemplary of some embodiments, and other embodiments are not limited to a particular one or more characteristics which distinguish a given core type from another core type.

As seen, processor 110-1 is a multi-core processor comprising heterogeneous cores including, at least, a one or more first cores 112 (represented as the illustrative cores 112a, . . . , 112m shown) of a first core type, as well as a one or more second cores 114 (represented as the illustrative cores 114a, . . . , 114n shown) of a second core type. In this example embodiment, the first core type corresponds to a first core size, wherein the second core type corresponds to a second core size which is smaller than the first core size (e.g., wherein cores 112 are of a type found in Core™ processors, and cores 114 are of a type found in Atom™ processors). For example, the first core type and the second core type correspond, respectively, to a first range of sizes including the first size, and a second (non-overlapping) range of sizes including the second size.

In some embodiments, some or all of cores 112, 114 are associated each with a respective integrated voltage regulator (or "IVR," not shown) which, for example, receives a primary regulated voltage and generates an operating voltage to be provided to one or more agents of the core(s) associated with that IVR. As such, some or all of the multiple cores are each able to operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR is powered down or off when a processor is placed into a certain low power state, while another power plane of another IVR remains active, or fully powered. In other embodiments, processors 110-1, . . . , 110-x omit some or all such IVRs—e.g., wherein one or more of cores 112, 114 receive a voltage from a centralized voltage regulator (e.g., VR 160) which, for example, is on a motherboard or other printed circuit board.

In various embodiments, a given core of processor 110-1 provides functionality execute a host OS (not shown) which includes—or otherwise supports the execution of—a thread scheduling process. Such a thread scheduling process determines, at least in part, how various threads are to be executed each at a respective one of cores 112, 114. In some embodiments, a thread scheduling process specifies, is provided with, or otherwise determines a pool of those one or more cores of processor 110-1 which are currently available to be selected to execute a given thread—e.g., wherein another one or more cores of processor 110-1 are currently inactive or otherwise unavailable for such selection. Based on a current (or expected future) state of processor 110-1, the thread scheduling process schedules a given thread for execution at a particular core which is currently in the pool of available cores. Thread migration and/or other thread scheduling by processor 110-1 includes operations which (for example) are adapted from conventional load balancing and/or other techniques to improve the power efficiency of a processor. Such conventional techniques are not detailed herein to avoid obscuring certain aspects of various embodiments.

In some embodiments, a host OS updates the pool of available cores dynamically—e.g., wherein a core which is not currently in the pool is subject to being transitioned, by the OS, to an inactive state for improved power efficiency. Some embodiments variously extend or otherwise improve upon existing thread scheduling techniques—and/or core activation/deactivation techniques—with power control logic which provides functionality to hint to an OS that a given core should be added to (or alternatively, removed from) a pool of available cores. For example, as shown in FIG. 1, processor 110-1 further includes a power control unit (PCU) 130 which facilitates thread scheduling to control power consumption by processor components (e.g., including some or all of cores 112, 114). In an embodiment, PCU 130 comprises hardware, software and/or firmware to facilitate the control of power consumption by processor 110-1 and/or one or more other processors of system 100. As seen, PCU 130 provides control information—directly or indirectly—to various ones of cores 112, 114. In some embodiments, PCU 130 additionally or alternatively provides control information to one or more IVRs (not shown) which each correspond to a respective one of cores 112, 114—e.g., to control the operating voltage generated (or to cause a corresponding IVR to be disabled in a low power mode).

In some embodiments, PCU 130 is coupled to receive information, e.g., in the form of one or more bits or signals, to indicate a status of one or more sensors 142. In one such embodiment, sensor(s) 142 are provided proximate to components of system 100, such as the cores 112, 114, interconnects 104 or 113, etc., to sense one or more characteristics of a voltage, temperature, operating frequency, operating voltage, power consumption (instant or averaged over a period of time), core status (e.g., active or inactive), inter-core communication activity, etc. Based on information from sensor(s) 142, PCU 130 provides communications to hint to an OS that thread scheduling should be modified to facilitate a transition by processor 110-1 to a different operational mode.

For example, PCU 130 provides functionality to receive or otherwise detect an indication that an amount of power supplied to multiple cores of processor 110-1—e.g., the multiple cores including cores 112 and cores 114—has changed (or is expected to change) to a level which is below a threshold power level. Based on such an indication, circuitry of PCU 130 (e.g., including the illustrative schedule hint circuitry 131 shown) performs operations to signal whether, in view of the indicated change in available power, a transition to a different operational mode of processor 110-1 would be more efficient (as compared to leaving processor 110-1 in a current operational mode, for example).

By way of illustration and not limitation, schedule hint circuitry 131 (or other suitable circuitry of PCU 130) includes, has access to, or otherwise operates based on predetermined reference information which specifies or otherwise indicates performance efficiency characteristics for different combinations of the multiple cores being active. Based on such reference information, and on the indicated change in available power, PCU 130 identifies an operational mode which would mitigate a loss in power efficiency (or alternatively, would improve on a gain in power efficiency) that would otherwise result from the indicated change. To facilitate a transition of processor 110-1 to such an operational mode, schedule hint circuitry 131 sends one or more signals which—in some embodiments—hint to a host OS that a particular one of the multiple cores should be excluded from (or alternatively, included in) a pool of cores to be available for thread scheduling.

For example, in various embodiment, schedule hint circuitry 131 provides a hint which specifies a particular core based on a prioritization of one core type over another core type. By way of illustration and not limitation, in some embodiments, a hint that a given core should be removed from a pool of cores (which are available for thread scheduling) is based on a first prioritization of a large core type over a small core type. Alternatively or in addition, a different hint—indicating that a given core should be added to such a pool of available cores—is based on a second prioritization of the small core type over the large core type. In an illustrative scenario according to one embodiment, PCU 130 provides such a hint directly or indirectly to an OS executed with cores 112, 114—e.g., via a register, table, or other suitable repository (illustrated as thread provisioning state 140)— which is accessible to the OS. Based at least in part on the hint provided by PCU 130, the OS determines whether the processor is to transition from one combination cores 112, 114 being active to a different combination cores 112, 114 being active.

Figure 2:
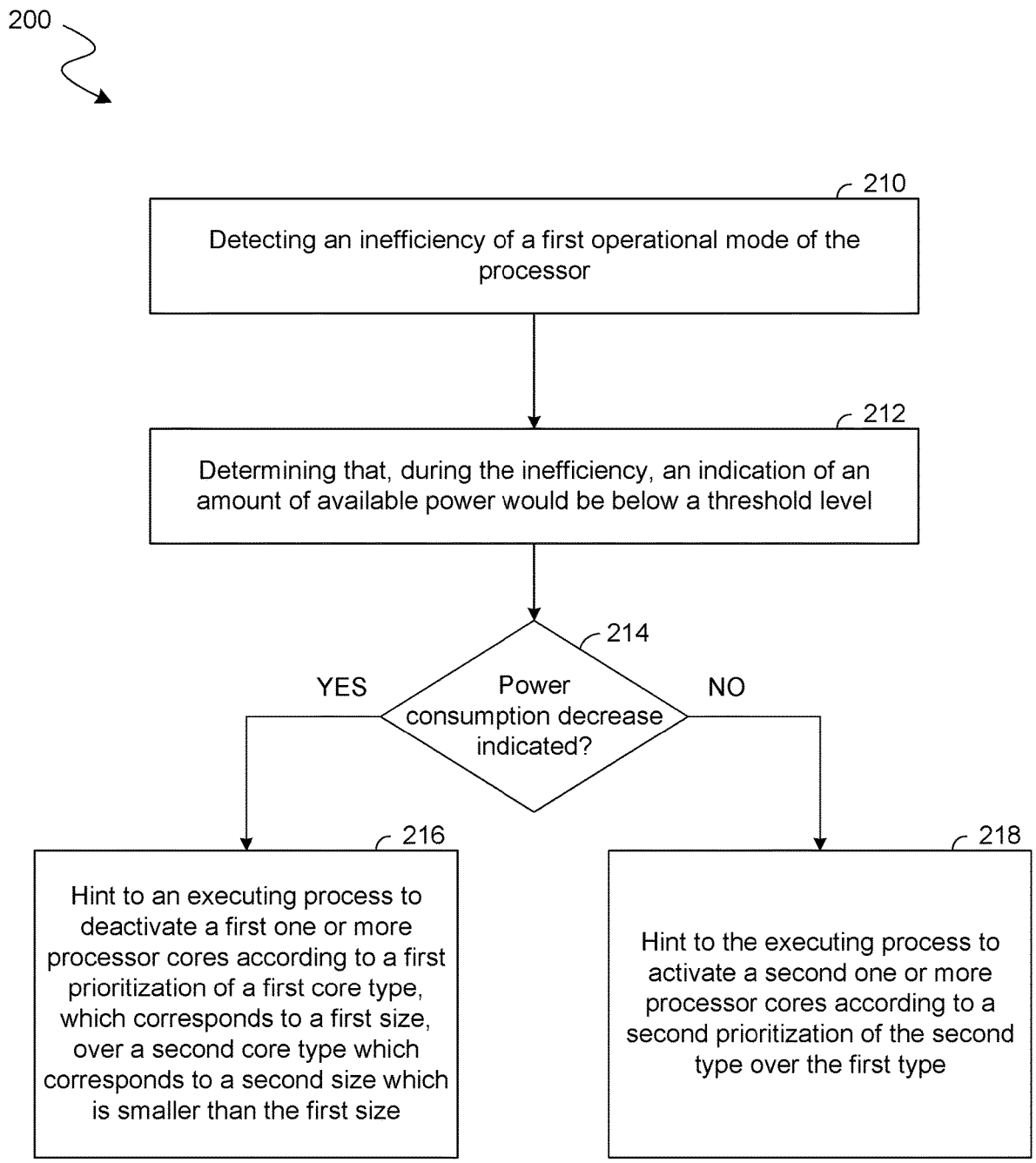
FIG. 2 shows a flow diagram illustrating features of a method to provide thread scheduling information to an executing process according to an embodiment.

FIG. 2 shows features of a method 200 to provide thread scheduling information to an OS (or other suitable process executing on a processor) according to an embodiment. Method 200 illustrates one example of an embodiment wherein, based on both a low power condition and a relative prioritization of different core types, a power control unit hints to an executing process one of an inclusion of a processor core in thread scheduling, or an exclusion of the processor core from such thread scheduling. Operations such as those of method 200 are performed, for example, with some or all of system 100.

In an embodiment, method 200 is performed with a power control unit of a processor which further comprises heterogeneous cores including both one or more first cores of a first core type, and one or more second cores of a second type. In one such embodiment, the first core type corresponds to a first level of power consumption (and/or to a first size)—e.g., wherein the second core type corresponds to a second level of power consumption which is less than the first level of power consumption (and/or to a second size which is smaller than the first size). For example, the first core type corresponds to a first range of maximum power consumption levels including the first power consumption level, wherein the second core type corresponds to a second range maximum power consumption levels including the second power consumption level.

As shown in FIG. 2, method 200 comprises (at 210) detecting an inefficiency of a first operational mode of a processor (such as processor 110-1). For example, the first operational mode is a current operational mode of the processor, wherein the inefficiency is a current inefficiency or, alternatively, an expected future inefficiency.

In some embodiments, the operational mode includes a particular combination of one or more processor cores each being in a respective active state—e.g., wherein the inefficiency is due at least in part to an amount of power which is currently available (or alternatively, which is expected to become available) to the processor in support of said combination. Additionally or alternatively, the inefficiency (and, for example, the detection thereof) is due at least in part to a change to a thermal condition, a processing workload and/or other such condition which affects an operational efficiency of the particular combination of one or more cores.

In various embodiments, the detecting of the inefficiency at 210 includes receiving or otherwise detecting an indication of the (actual or expected) amount of power—e.g., wherein the indication explicitly identifies the amount or, alternatively, only indirectly indicates said amount. For example, such an indication includes or is otherwise based on an operational frequency of the cores, a level of a supply voltage provided to the cores, and/or the like—e.g., wherein the detecting at 210 comprises detecting a combination of a supply voltage and an operational frequency.

In various embodiments, the detecting at 210 comprises receiving one or more signals which specify or otherwise indicate that one combination of one or more active cores—as compared to some alternative combination of one or more active cores—is relatively inefficient with respect to an actual (or expected future) one or more conditions under which the processor is to operate. For example, such one or more conditions comprise a given level of a supply voltage, a given operational frequency, and/or other such characteristics of power delivery. Alternatively or in addition, such one or more conditions comprise a thermal state, a processor workload and/or other condition which affects an efficiency of operation of the cores. In some embodiments, the detecting at 210 comprises receiving a signal which specifies or otherwise indicates an instance of a predefined power change event—e.g., including a display device, drive or other peripheral being coupled to (or alternatively, decoupled from) a system which includes the processor.

Method 200 further comprises (at 212) determining that, during the inefficiency, an indication of the amount of available power would be below a threshold level. In one such embodiment, the determining at 212 comprises identifying an actual (or expected) transition—e.g., an increase or a decrease—of a supply voltage to a level which is below a threshold voltage level. Additionally or alternatively, the determining at 212 comprises (for example) identifying an actual or expected transition of an operational frequency to a frequency which is below a threshold.

By way of illustration and not limitation, the determining at 212 comprises evaluating an actual (or expected) level of a supply voltage which is provided to the cores—e.g., the evaluating to compare the level to a minimum voltage level Vcc_min which supports thread execution. Alternatively or in addition, the determining at 212 comprises evaluating an operational frequency of the cores based on a reference frequency which, for example, corresponds to an operational point of maximum efficiency for a given level of a supply voltage.

In some embodiments, the threshold is calculated (e.g., recalculated), updated or otherwise determined dynamically during runtime operation of the processor. In one such embodiment, an Energy Aware Race to Halt (EARtH) algorithm, or any of various other suitable power management algorithms, is adapted to updates a value of the threshold on the fly—e.g., to facilitate a hysteresis functionality being provided with a PCU.

Based on the determining at 212, method 200 generates a hint that the processor is to transition to a second operational mode based on the indication. The hint indicates that the processor is to deactivate one or more cores according to a first prioritization of the first core type over the second cores type, or—alternatively—that the processor is to activate one or more cores according to a second prioritization of the second core type over the first core type. For example, in the illustrative embodiment shown, based on the determining at 212, method 200 signals one or more cores of the processor to hint a transition by the processor to a different operational mode (e.g., where the transition is to include activating, or deactivating, at least one core). For example, method 200 further comprises performing an evaluation (at 214) to determine whether or not a decrease in power consumption by the processor would facilitate improved power efficiency (or, alternatively, would mitigate a loss in power efficiency).

Where it is indicated at 214 that decreased power consumption would contribute to improved efficiency, method 200 (at 216) sends one or more signals—e.g., from the PCU to a mode register or other suitable resource of the processor—which hint to an executing software process (executed by the processor) to deactivate one or more cores of the processor. In some embodiments, the deactivation hinted at 216 is according to a first prioritization of the first core type over the second core type. For example, in one such embodiment, the hinting at 216 is further based on a condition wherein each of the second (small) cores is in a respective active state, and at least one of the first cores is in a respective active state, wherein the hint suggests that one of the first cores be deactivated.

In some embodiments, the hinting at 216 comprises the PCU successively sending first hints (which each identify a respective one of the first cores) to the executing process, until a test condition is satisfied, or until each of the first cores is in a respective inactive state. The test condition indicates, for example, that the processor has succeeded in transitioning to the intended operational mode. Such a test condition includes, for example, an operational frequency being sufficiently close (according to some predefined criteria) to a reference frequency Fmax—e.g., while a supply voltage is at a minimum level Vcc_min which supports thread execution by a given core(s). In one such embodiment, the hinting at 216 further comprises the PCU successively sending second hints (which each identify a respective one of the second cores) to the executing process until the test condition is satisfied, or until only one of the first cores is in an active state.

Where it is instead indicated at 214 that increased power consumption would contribute to improved efficiency, method 200 (at 218) sends one or more signals which hint to the executing process to activate one or more cores of the processor. In some embodiments, the activation hinted at 218 is according to a second prioritization of the second core type over the first core type. For example, in one such embodiment, the hinting at 218 is further based on a condition wherein each of the first (large) cores is in a respective inactive state, and at least one of the second (small) cores is in a respective inactive state, wherein the hint suggests that one of the second cores be activated.

In some embodiments, the hinting at 218 comprises the PCU successively sending third hints (which each identify a respective one of the second cores) to the executing process, until a test condition is satisfied, or until each of the second cores is in a respective active state. In one such embodiment, the hinting at 218 further comprises the PCU successively sending fourth hints (which each identify a respective one of the first cores) to the executing process until the test condition is satisfied, or until each of the second cores is in an active state.

In various embodiments, method 200 further comprises additional operations (not shown) to provide to the executing process another hint which is independent of both the first prioritization and the second prioritization. In one such embodiment, the additional operations comprise detecting a second inefficiency of some third operational mode of the processor, and determining that, during the second inefficiency, the indication of available power would be above the threshold. For example, a predetermined threshold value for the indication delineates a first range of values, for which the first and second prioritizations are variously used to hint core (de)activation, from a second range of values for which neither of the first or second prioritizations is so used. Based on such detecting of the second inefficiency, the PCU determines that a different operational mode of the processor would be more efficient (as compared to leaving the processor in a current operational mode). To facilitate a transition of the processor to this different operational mode, the PCU hints to the executing process that one or more cores are to be activated—e.g., to achieve a combination of active cores which is inconsistent with the first prioritization and/or the second prioritization. In one such embodiment, additional operations of method 200 further signal the processor to transition to a fourth operational mode, wherein such additional signaling comprising hinting to the process to deactivate one or more of the multiple cores independent of the first prioritization, or to activate one or more of the multiple cores independent of the second prioritization. In an illustrative scenario according to one embodiment, the processor transitions to an operational mode wherein one or more cores of the first core type are active while one or more cores of the second type are inactive.

Figure 3:
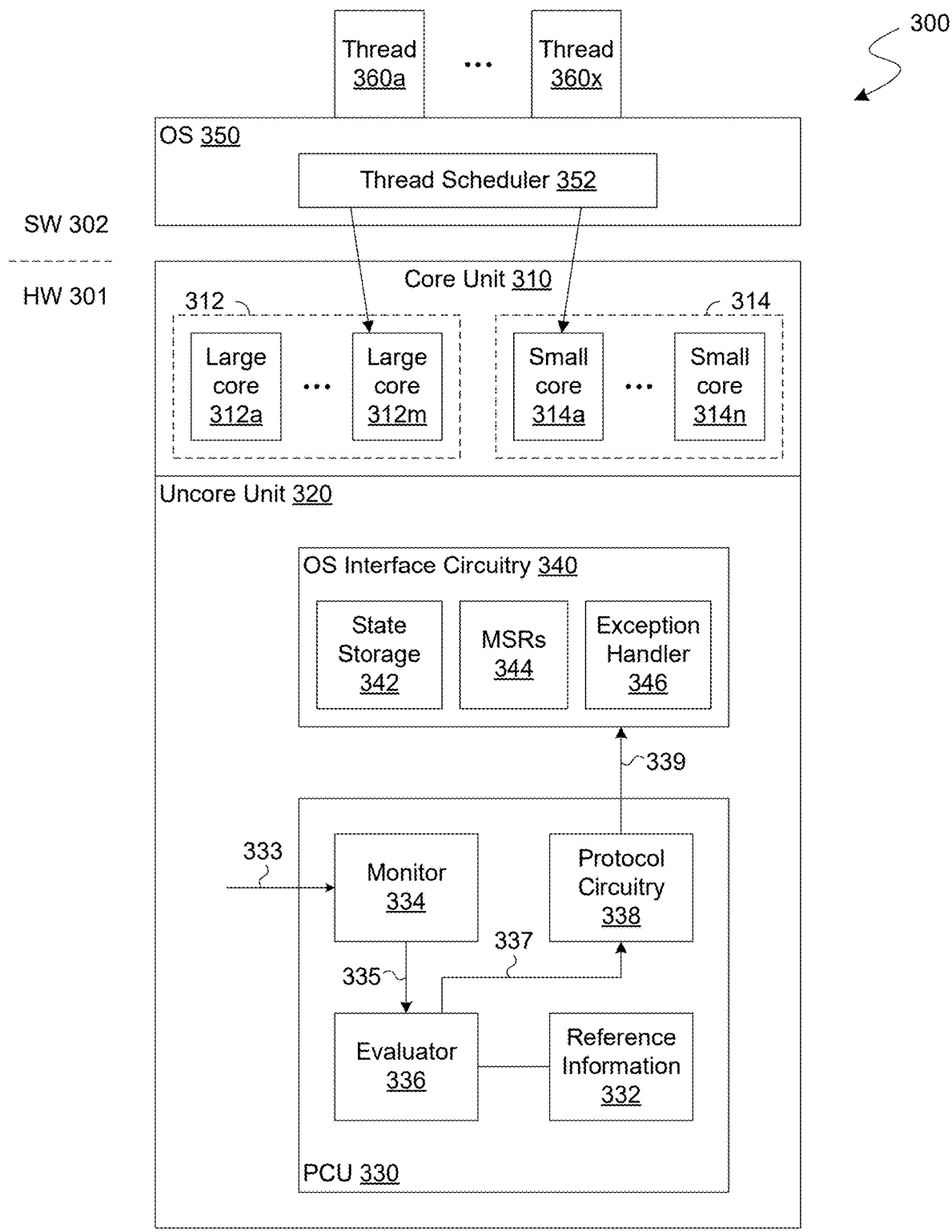
FIG. 3 shows a block diagram illustrating features of a processor to hint to an executing process an operational mode to be configured according to an embodiment.

FIG. 3 shows features of a processor 300 comprising circuitry to provide a hint of an operational mode which is to be configured according to an embodiment. In various embodiments, processor 300 provides functionality such as that of system 100—e.g., wherein one or more operations of method 200 are performed with processor 300.

As shown in FIG. 3, hardware (HW) 301 of processor 300 comprises a core unit 310 which includes heterogeneous cores to variously execute software (SW) 302. Processor 300 further comprises an uncore unit 320 including various circuit resources to support said execution of SW 302. During operation of processor 300, the SW 302 executed with core unit 310 comprises an operating system (OS) 350 and one or more threads—e.g., including the illustrative threads 360a, . . . , 360x shown—which execute on, or are otherwise supported by, OS 350. In one such embodiment, OS 350 includes or otherwise supports the execution of a process (such as the illustrative thread scheduler 352 shown) which, at various times, designates for a given one of threads 360a, . . . , 360x a respective processor core which is to execute said thread.

In various embodiments, the scheduling of a given thread for execution on a particular core is based on a hint which is provided to OS 350 from a power control unit (PCU) 330 of uncore unit 320. As variously described herein, such a hint is based on a relative prioritization of different core types and, for example, on an indication that an amount of power available to the core unit 310 is to be below a threshold power level.

In the example embodiment shown, core unit 310 comprises heterogeneous types of hardware or physical cores, including one or more so-called large cores—e.g., including the illustrative large cores 312a, . . . , 312m shown (generically large core 312)— and a plurality of so-called small cores 314a, . . . , 314n (generically small core 314). In various embodiments, these different core types execute different ISAs, for example, and/or are physically disparate in size and/or available resources. In some embodiments, the different ISAs are realized as a given instruction set architecture, and a subset of this instruction set architecture. For example, large cores 312 execute all instructions of an ISA, while small cores 314, which have a lesser number of architectural and micro-architectural resources including different/smaller register structures, execution units and so forth, only execute a subset of the ISA. In this way, such different ISAs partially overlap, in some embodiments. In other embodiments, the ISAs to be handled by the different core types are completely different.

To promote power efficient operation of processor 300, uncore unit 320 comprises OS interface circuitry 340 which, for example, facilitates communication of thread scheduling information between PCU 330 and OS 350. In one such embodiment, OS interface circuitry 340 enables PCU 330 to determine a current state of the thread scheduling by thread scheduler 352. Additionally or alternatively, OS interface circuitry 340 includes or otherwise facilitates an interface by which PCU 330 directly or indirectly provides to OS 350 a hint as to whether a particular core is to be included in—or alternatively, omitted from—such thread scheduling.

For example, at different times, thread scheduler 352 schedules various ones of threads 360a, . . . , 360x each to a respective one of cores 312, 314. PCU 330 includes, is coupled to access, or otherwise operates based on a repository (e.g., such as the illustrative state storage 342 of OS interface circuitry 340) of information which specifies or otherwise indicates a current correspondence of threads 360a, . . . , 360x each to a respective one of cores 312, 314. By way of illustration and not limitation, state storage 342 comprises one or more registers, tables and/or other suitable resources which are updated by OS 350 as thread scheduler 352 schedules various ones of threads 360a, . . . , 360x to be executed each by a respective one of cores 312, 314. In some embodiments, PCU 330 accesses state storage 342 to determine which of cores 312, 314 is currently active (or inactive) and/or otherwise included in—or alternatively, omitted from—a pool of cores which are available for thread scheduling.

Circuitry of PCU 330 comprises a monitor 334 which is configured to receive one or more signals—e.g., including the illustrative signal 333 shown—which specify or otherwise indicate a current or expected future state of a power delivery to (and/or a power constraint of) core unit 310. In one such embodiment, signal 333 includes, or is otherwise based on, a communication from one or more sensors 142, power manager 170 or other suitable circuitry, for example. Based on a determination that an amount of power available to core unit 310 is to decrease (or alternatively, increase) to a level which is below some predetermined threshold power level, monitor 334 sends a signal 335 which indicates, to an evaluator 336 of PCU 330, the possible need to change an operational mode of core unit 310.

Based on signal 335, evaluator 336 accesses reference information 332 which specifies or otherwise indicates a correspondence of multiple operational modes of processor 300 each to a respective one or more power and/or performance efficiency metrics. The multiple operational modes of processor 300 each include a different respective combination of one or more active cores of core unit 310. For example, a given one such operational mode O(x,y) includes (x+y) cores being active, wherein the integer x represents a number of cores 312 (if any) which are each active during the state, and the integer y represents a number of cores 314 (if any) which are each active during the state.

In various embodiments, reference information 332 specifies or otherwise indicates a first prioritization of a large core type over a small core type, wherein the first prioritization is to determine an order according to which a given one or more of cores 312, 314 are to be selected for omission from thread scheduling (and, for example, selected for deactivation). In one such embodiment, reference information 332 further specifies or otherwise indicates a second prioritization of the small core type over the large core type, wherein the second prioritization is to determine an order according to which a given one or more of cores 312, 314 are to be selected for inclusion in thread scheduling (and, for example, selected for activation). The first prioritization and/or the second prioritization are used by evaluator 336 to determine identify one or more of cores 312, 314 based on signal 335.

For example, based on the first prioritization or the second prioritization (and on the current state of thread scheduling as indicated, for example, in state storage 342), evaluator 336 identifies one or more cores to be suggested to OS 350 as candidates to be deactivated—or alternatively, to be activated—to facilitate a transition to the identified operational mode. Evaluator 336 then sends to a signal 337 which indicates the identified one or more processor cores to protocol circuitry 338 of PCU 330.

Protocol circuitry 338 illustrates any of a variety of suitable circuit resources to hint to OS 350—e.g., with the illustrative signal 339 shown—that the one or more cores indicated by signal 337 are to be omitted from (or alternatively, included in) the pool of available cores for thread scheduler 352. In one example embodiment, signal 339 comprises or otherwise results in an exception, a software interrupt or other suitable communication with SW 302— e.g., wherein an exception handler 346 of OS interface circuitry 340 relays the hint to OS 350 on behalf of PCU 330. Alternatively, signal 339 writes the hint information to a register of uncore unit 320 (such as one of the illustrative mode set registers MSRs 344 shown) which is accessible to OS 350. Uncore unit 320 provides any of a various other sideband channels, microcontroller circuitry and/or other mechanisms to facilitate communication of hint information between PCU 330 and OS 350, in different embodiments.

It is to be appreciated that signal 339 represents a hint at least insofar as OS 350 is not required to change the pool of available cores as indicated by the hint. By way of illustration and not limitation, OS 350 may forego, limit, or otherwise change whether and/or how thread scheduling is to be adapted based on the hint in signal 339. By way of illustration and not limitation, in some embodiments, thread scheduler 352 has access to additional information—e.g., describing respective data processing overhead of different threads—which provides an additional basis in determining whether and/or how threads 360a, . . . , 360x are to be allocated each to a respective core.

In various embodiments, reference information 332 also provides one or more additional criteria—e.g., other than the first prioritization or the second prioritization—for evaluator 336 to further identify a particular one or more cores to be included in (or omitted from) thread scheduling. Such further identification is performed, for example, where the amount of power available to core unit 310 is to be above a threshold power level. In one such embodiment, reference information 332 further indicates, for each of multiple operational modes of processor 300, a respective set of efficiency metrics which each correspond to a different respective amount of power being made available to support said operational mode. Circuitry of evaluator 336 performs an evaluation to identify an operational mode which, of the multiple operational modes, would provide for the most efficient operation of processor 300 during a delivery of power above the threshold power level. PCU 330 further specifies or otherwise indicates such an operational mode to OS 350 (for example, via OS interface circuitry 340), in various embodiments.

Figure 4:
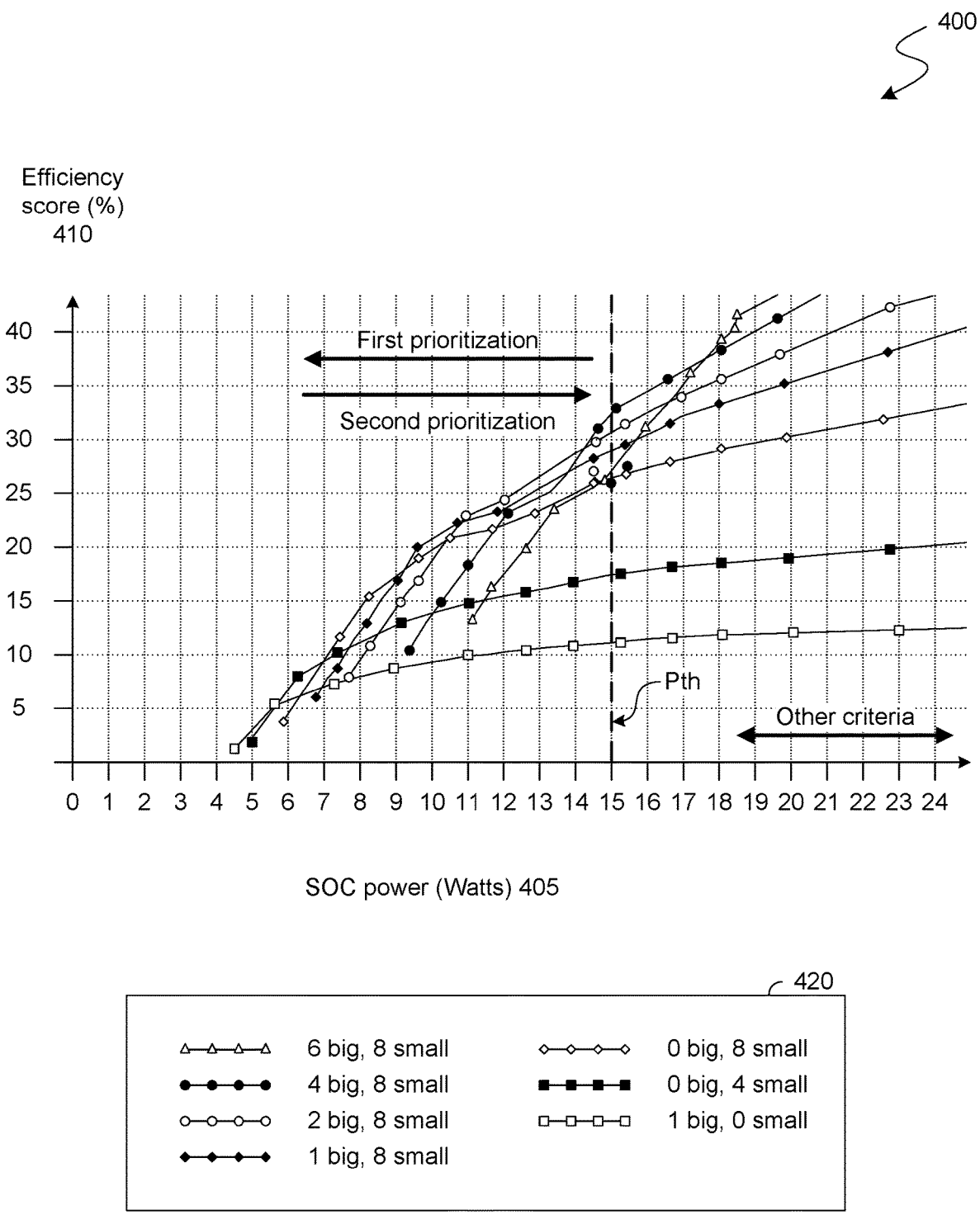
FIG. 4 shows a graph illustrating power efficiency characteristics which provide a basis to determine an operational mode of a processor according to an embodiment.

FIG. 4 shows features of a graph 400 illustrating power efficiency characteristics used to determine an operational mode of a processor according to an embodiment. Graph 400 represents characteristics of processor cores which, for example, include cores 112 and cores 114 (or, in another embodiment, include cores 312 and cores 314). In various embodiments, one or more operations of method 200 are performed based on reference information which specifies or otherwise indicates characteristics such as those illustrated in graph 400.

As shown by the legend 420 in FIG. 4, graph 400 includes various plots in a range of efficiency scores 410, where the plots each correspond to a different respective operational mode of a processor on a system-on-chip (SOC). The processor comprises heterogeneous cores (in this example, including first cores of a large core type, and second cores of a small core type), wherein the operational modes each include a different respective combination of the heterogeneous cores being active. In one example scenario, efficiency scores 410 are determined according to any of various benchmarking techniques developed, for example, by the Standard Performance Evaluation Corporation of Gainesville, Va., USA.

As shown in graph 400, when the available SOC power 405 is in a range above 20 W (for example), the most efficient configuration is to have an (6b, 8s) operational mode of the processor. In this particular context, "(Xb, Ys)" indicates an operational mode wherein X big cores and Y small cores are active (where X and Y are both integers). However, as the available SOC power 405 gets smaller—e.g., in a range below 18 W (for example)—the efficiency curves shown in graph 400 variously fall off (and/or end). A review of graph 400 shows that the relative order and/or rate at which these efficiency curves variously fall off and/or end corresponds generally to how the curves each correspond to a respective combination of one or more active large cores and/or one or more active small cores.

For example, referring now to the operational modes wherein all small cores are active, the (6b, 8s) curve in graph 400 drops under the (4b, 8s) curve as SOC power 405 falls below 17.5 W, whereas the (4b, 8s curve) drops under the (2b, 8s) curve as SOC power 405 falls below 14.25 W, and the (2b, 8s) curve drops under the (1b, 8s) curve as SOC power 405 falls below 11.0 W. Furthermore, the (1b, 8s) curve in graph 400 drops under the (0b, 8s) curve as SOC power 405 falls below 9.25 W, whereas the (0b, 8s) curve drops under the (0b, 4s) curve as SOC power 405 falls below 7.0 W.

To accommodate and/or avail of power efficiency characteristics such as those illustrated in graph 400, some embodiments variously provide a relative prioritization of different core types to facilitate the selective deactivation (or alternatively, activation) of one or more cores. For example, some embodiments provide a first prioritization, of a large core type over a small core type, to facilitate a transition of the processor to a different operational mode based on a decrease to SOC power 405. In one such embodiment, this first prioritization determines at least in part an order in which one or more cores are each to be identified—e.g., in a respective hint to an operating system—as a candidate to be removed from consideration in thread scheduling. Such removal of a given core from thread scheduling facilitates deactivation of that given core to mitigate a drop in efficiency that would otherwise result from SOC power 405 decreasing to some level which is below a threshold power level Pth (in this example embodiment, 15 W).

Additionally or alternatively, some embodiments provide a second prioritization, of the small core type over the large core type, to facilitate a transition of the processor to a different operational mode based on an increase to SOC power 405. In one such embodiment, this second prioritization determines at least in part an order in which one or more cores are each to be identified—e.g., in a respective hint to an operating system—as a candidate to be added for consideration in thread scheduling. Such inclusion of a given core in thread scheduling facilitates activation of that given core to avail of an opportunity to increase efficiency due to SOC power 405 increasing to some level which is below the threshold power level Pth.

Figure 5A:
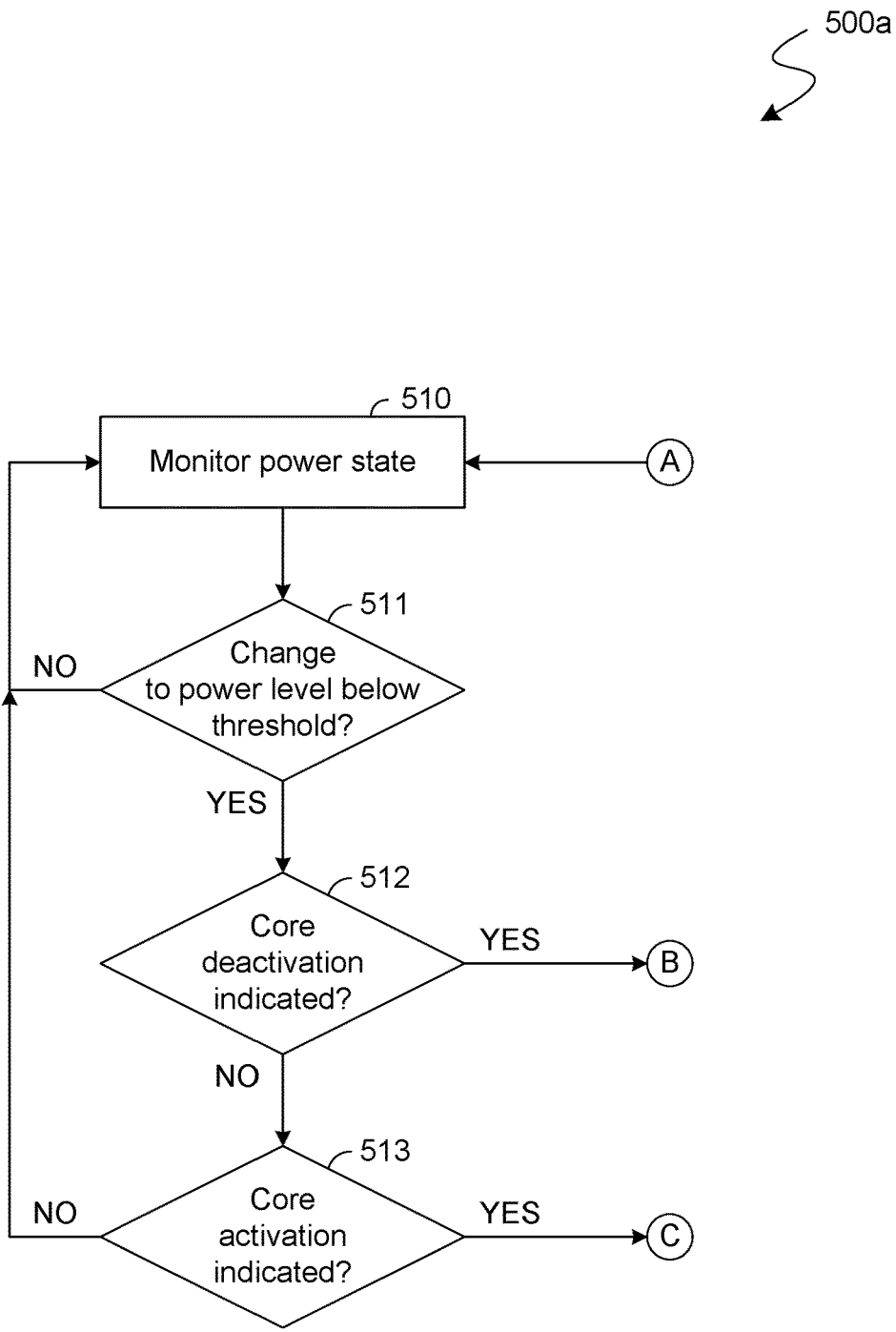
FIGS. 5A-5C shows a flow diagram illustrating features of a method to propose thread scheduling by a processor according to an embodiment.
Figure 5B:
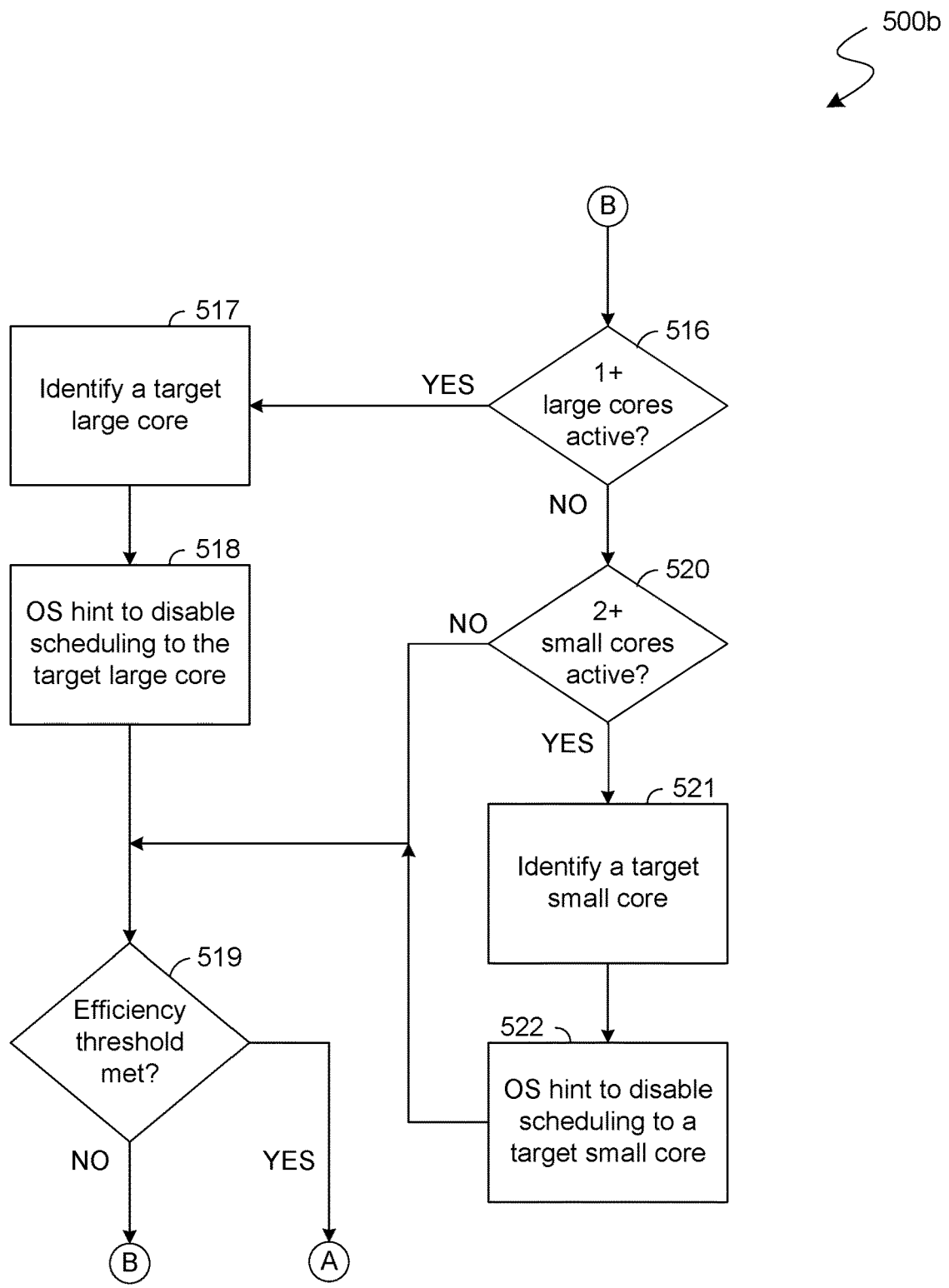
Figure 5C:
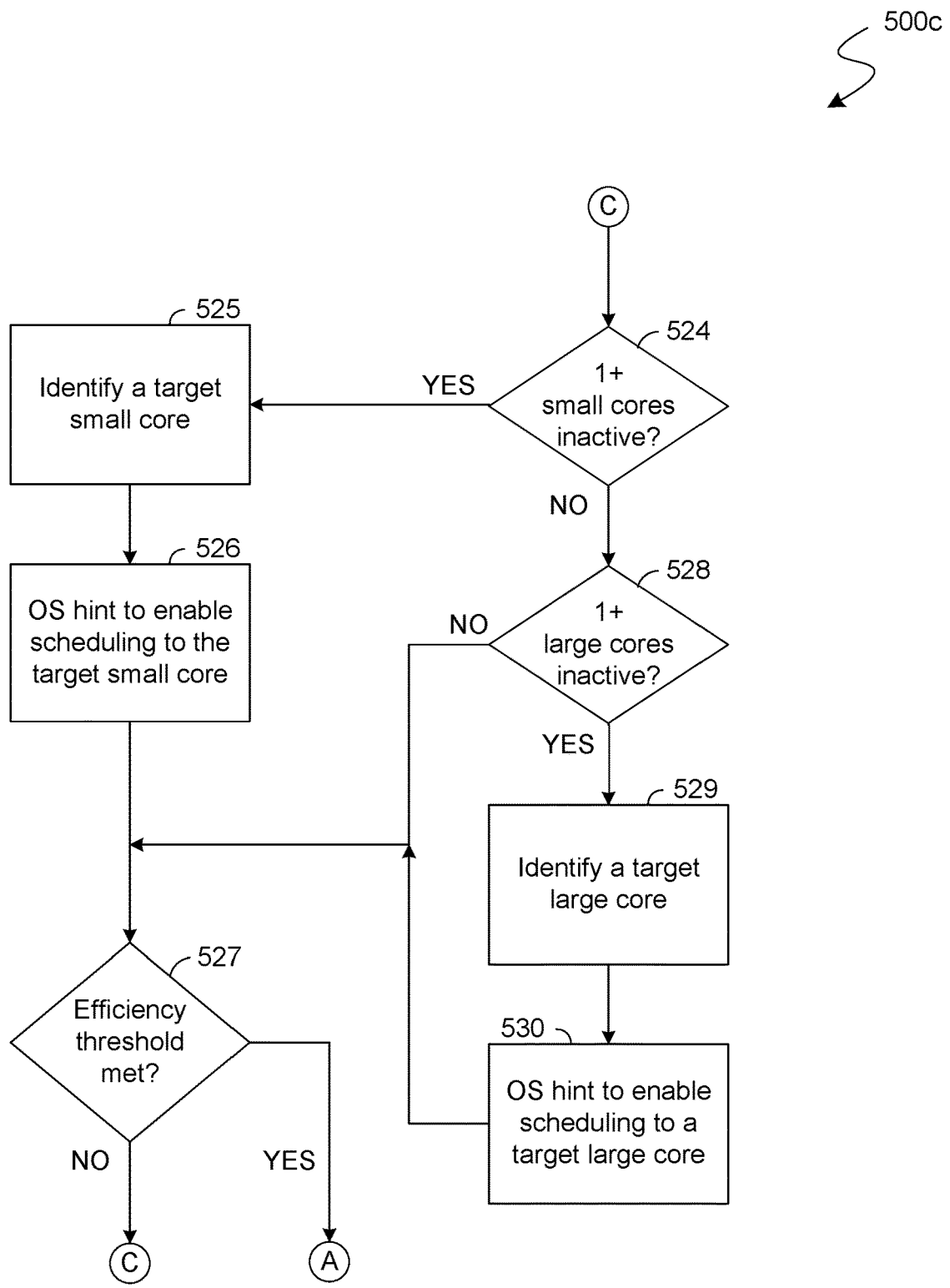

FIGS. 5A-5C show respective operations 500a, 500b, 500c of a method 500 to propose thread scheduling by a processor according to an embodiment. Method 500 illustrates one embodiment wherein a PCU sends at least one hint to an OS, wherein such sending is based on an indication of a changed power state, and further based on the detecting of a particular combination of one or more cores being active, while one or more other cores are inactive. In various embodiments, the PCU conditionally sends one or more first hints to the OS successively—the one or more first hints each targeting a respective core of a given core type—until a test condition is satisfied, or until each of the targeted cores is in a respective inactive (or alternatively, active) state. In one such embodiment, the PCU further conditionally sends to the OS one or more second hints which each target a respective core of a different core type—until the test condition is satisfied, or until each of the targeted cores is in the respective inactive (or alternatively, active) state. In various embodiments, method 500 provides functionality such as that of method 200—e.g., wherein one or more operations of method 500 are performed with circuitry of system 100, or of processor 300.

As shown in FIGS. 5A-5C, operations 500a comprise (at 510) monitoring a power state of a processor—e.g., wherein the processor state includes one or more characteristics of power delivery and/or one or more power requirements of the processor. In an embodiment, the monitoring at 510 is to detect for one or more indicia of an actual change, or expected future change, to an availability of power to heterogeneous cores (e.g., cores 112 and cores 114) of a processor. Method 500 further comprises performing one or more evaluations, based on the monitoring at 510, to determine whether the processor should transition from a current operational mode to another, more efficient operational mode, where such transition includes deactivating at least one currently active processor core (or alternatively, activating at least one currently inactive processor core).

By way of illustration and not limitation, method 500 performs an evaluation (at 511) to determine whether a level of power supplied to the processor has changed (or is expected to change) to a level which is below some predetermined threshold. For example, the evaluating at 511 is to determine whether the processor has transitioned (or, alternatively, is expected to transition) to an operational frequency which is below a threshold frequency. Alternatively or in addition, the evaluating at 511 is to determine whether a voltage supplied to the processor has changed (or is expected to change) to a level which is below a threshold voltage level.

Where it is indicated at 511 that no such change to the power level is indicated, method 500 performs a next instance of the monitoring at 510. Otherwise, method 500 performs an evaluation (at 512) to determine whether, given the detected change to the power level, a more efficient operational mode of the processor would be achieved by the deactivation of one or more cores. Where core deactivation is indicated at 512, method 500 proceeds to the operations 500b shown in FIG. 5B. Otherwise, method 500 performs an evaluation (at 513) to determine whether, given the detected change to the power level, a more efficient operational mode of the processor would be achieved by activating one or more cores. Where core activation is indicated at 513, method 500 proceeds to the operations 500c shown in FIG. 5C. Otherwise, method 500 performs a next instance of the monitoring at 510.

As shown in FIG. 5B, operations 500b comprise performing an evaluation (at 516) to determine whether at least one large core is currently in a respective active state (and thus available to be transitioned to an inactive state). Where it is determined at 516 that at least one large core is currently active, method 500 (at 517) identifies, from among the one or more currently-active large cores, a "target" core to be identified as a next candidate for possible deactivation. Method 500 then communicates a hint (at 518) to an OS which is executing with the processor, wherein the hint indicates the target large core which was most recently identified at 517. For example, hinting at 518 comprises the power control unit writing to a mode register, issuing a software interrupt, or otherwise signaling to identify the targeted large core as a candidate to be removed from a pool of cores which are available for thread scheduling. After the hinting at 518, method 500 performs an evaluation (at 519) to determine whether the most recently provided hint has resulted in the satisfaction of some predetermined test condition by a power state of the processor—e.g., where said test condition corresponds to the satisfaction of some efficiency threshold and/or is otherwise indicative of the processor successfully transitioning to the intended more efficient operational mode. Where the evaluating at 519 detects the satisfaction of said condition, method 500 performs a next instance of the monitoring at 510. Otherwise, method 500 performs a next instance of the evaluating at 516.

Where it is instead determined at 516 that each of the one or more large cores is currently inactive, method 500 performs an evaluation (at 520) to determine whether at least two or more small cores are each currently in a respective active state (and thus available to be transitioned to an inactive state). Where it is determined at 520 that no more than one of the small cores is currently active, method 500 performs a next instance of the evaluation at 519. Otherwise, method 500 (at 521) identifies, from among the two or more currently-active small cores, a target core to be identified as a next candidate for possible deactivation. Method 500 then communicates to the OS (at 522) a hint which indicates the target small core which was most recently identified at 521. After the hinting at 522, method 500 performs a next instance of the evaluation at 519.

As shown in FIG. 5C, operations 500c comprise performing an evaluation (at 524) to determine whether at least one small core is currently in a respective inactive state (and thus available to be transitioned to an active state). Where it is determined at 524 that at least one small core is currently inactive, method 500 (at 525) identifies a next target core from among the one or more currently-inactive small cores. Method 500 then communicates (at 526) a hint to indicate to the OS that the target small core, which was most recently identified at 525, is a candidate to be added to the pool of cores available for thread scheduling. After the hinting at 526, method 500 performs an evaluation (at 527) to determine whether the most recently provided hint has resulted in the satisfaction of some predetermined test condition which (for example) corresponds to the satisfaction of some efficiency threshold and/or is otherwise indicative of the processor successfully transitioning to the intended more efficient operational mode. Where the evaluating at 527 detects the satisfaction of said condition, method 500 performs a next instance of the monitoring at 510. Otherwise, method 500 performs a next instance of the evaluating at 524.

Where it is instead determined at 524 that each of the small cores is currently active, method 500 performs an evaluation (at 528) to determine whether one or more large cores are each currently in a respective inactive state (and thus available to be transitioned to an active state). Where it is determined at 528 that none of the one or more large cores is currently inactive, method 500 performs a next instance of the evaluation at 527. Otherwise, method 500 (at 529) identifies, from among the one or more currently-inactive large cores, a target core to be identified as a next candidate for possible deactivation. Method 500 then communicates to the OS (at 530) a hint which indicates that the target large core, which was most recently identified at 529, is a candidate to be added to the pool of cores available for thread scheduling. After the hinting at 530, method 500 performs a next instance of the evaluation at 527.

As shown in FIG. 5B, operations 500b comprise performing an evaluation (at 516) to determine whether at least one large core is currently in a respective active state (and thus available to be transitioned to an inactive state). Where it is determined at 516 that at least one large core is currently active, method 500 (at 517) identifies, from among the one or more currently-active large cores, a "target" core to be identified as a next candidate for possible deactivation. Method 500 then communicates a hint (at 518) to an OS which is executing with the processor, wherein the hint indicates the target large core which was most recently identified at 517. For example, hinting at 518 comprises the power control unit writing to a mode register, issuing a software interrupt, or otherwise signaling to identify the targeted large core as a candidate to be removed from a pool of cores which are available for thread scheduling. After the hinting at 518, method 500 performs an evaluation (at 519) to determine whether the most recently provided hint has resulted in the satisfaction of some predetermined test condition by a power state of the processor—e.g., where said test condition is indicative of the processor successfully transitioning to the intended more efficient operational mode. Where the evaluating at 519 detects the satisfaction of said condition, method 500 performs a next instance of the monitoring at 510. Otherwise, method 500 performs a next instance of the evaluating at 516.

Where it is instead determined at 516 that each of the one or more large cores is currently inactive, method 500 performs an evaluation (at 520) to determine whether at least two or more small cores are each currently in a respective active state (and thus available to be transitioned to an inactive state). Where it is determined at 520 that no more than one of the small cores is currently active, method 500 performs a next instance of the evaluation at 519. Otherwise, method 500 (at 521) identifies, from among the two or more currently-active small cores, a target core to be identified as a next candidate for possible deactivation. Method 500 then communicates to the OS (at 522) a hint which indicates the target small core which was most recently identified at 521. After the hinting at 522, method 500 performs a next instance of the evaluation at 519.

FIG. 6 shows pseudocode 600 representing a process to provide thread scheduling information to an operating system according to an embodiment. In various embodiments, an algorithm such as that represented by pseudocode 600 is performed with hardware and/or other suitable logic of PCU 130 or PCU 330—e.g., wherein the algorithm includes operations of one of methods 200, 500.

The algorithm represented by pseudocode 600—performed, for example, with power management firmware ("pcode") of a PCU— provides a hint to a processor which comprises N heterogeneous cores (where N is an integer greater than 1). The hint is to suggest, to an OS executed with the processor, that a particular one of N cores should be included in, or alternatively omitted from, thread scheduling—e.g., where such inclusion or omission is to facilitate activation or deactivation (respectively) of the suggested core.

In pseudocode 600, an ith core of the N cores is indicated as $c(i)$, where "i" is any integer in a set of possible core index values $\{0, \ldots, (N-1)\}$. In the illustrative embodiment shown, the N cores comprise m cores—indicated as $c(0), \ldots, c(m-1)$— which are each of a small core type (where m<N). The N cores further comprise (N-m) other cores—indicated as $c(m), \ldots, c(N-1)$— which are each of a large core type. Performance constraints of the multi-core processor include a minimum supply voltage level—represented herein as Vcc_min—which supports one or more cores of the processor being each in a respective active state to enable thread execution. An operational frequency—represented herein as Fmax[Vcc_min]— corresponds to a maximum power efficiency of the processor while the supply voltage is at the level Vcc_min.

As indicated in pseudocode 600, the deactivation of a given small core—e.g., to consolidate thread execution onto fewer cores in response to a decrease in available power—is to take place only where all of the one or more large cores are currently inactive. Alternatively, the activation of a large core—e.g., to facilitate improved efficiency when the available power increases—is to take place only where all small cores are currently active. Accordingly, the algorithm represented by pseudocode 600 implements a first prioritization which provides an order $c(0), \ldots, c(m-1), c(m), \ldots, c(N-1)$— from a highest priority core to a lowest priority core—according to which a particular currently-inactive core is next to be hinted to an OS for activation and inclusion in thread scheduling. In the first prioritization, the m small cores are prioritized over each of the (N−m) large cores. The algorithm further implements a second prioritization providing a different order $c(N-1), \ldots, c(m), c(m-1), \ldots, c(0)$— from a highest priority core to a lowest priority core—according to which a particular currently-active core is next to be hinted to the OS for deactivation and exclusion from thread scheduling. In the second prioritization, the (N-m) large cores are prioritized over each of the m small cores.

Although some embodiments are not limited in this regard, pseudocode 600 further evaluates one or more hysteresis conditions to determine whether or how a given core is to be suggested in a hint to an OS. By way of illustration and not limitation, such a hysteresis condition (e.g., to be evaluated based on a corresponding threshold value) comprises an amount of time that an operational frequency fc has been below (or alternatively above) Fmax[Vcc_min], an extent to which the operational frequency fc has been below (or alternatively above) Fmax[Vcc_min], a rate of change of the operational frequency fc, or the like. In one such embodiment, a hysteresis breaking condition comprises an indication—including a supply voltage level, an operational frequency and/or the like—that an amount of available power exceeds (or is expected to exceed) a threshold level such as the power level Pth shown in graph 400. However, other embodiments are not limited with respect to the particular manner (if any) in which such hysteresis is to be applied. In various embodiments, application of such hysteresis includes operations adapted (for example) from conventional techniques for controlling processor power consumption.

The figures described herein detail exemplary architectures and systems to implement embodiments of the above. In some embodiments, one or more hardware components and/or instructions described herein are emulated as detailed below, or implemented as software modules.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8A:
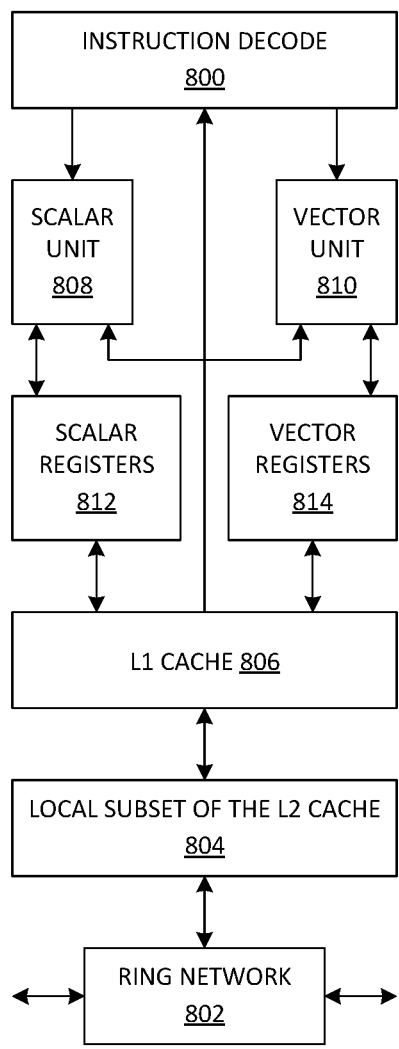
FIGS. 8A through 8B illustrate a block diagram of a more specific exemplary in-order core architecture, which core would be one of several logic blocks (including other cores of the same type and/or different types) in a chip.
Figure 8B:
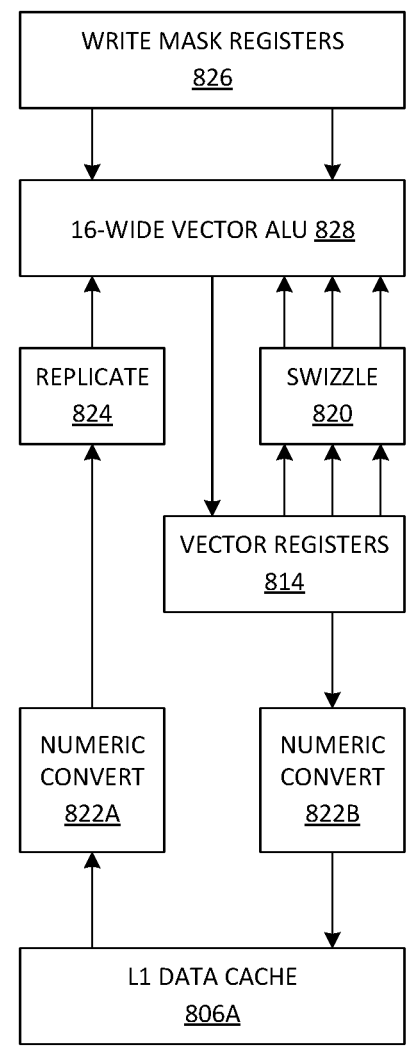

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 806, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Figure 9:
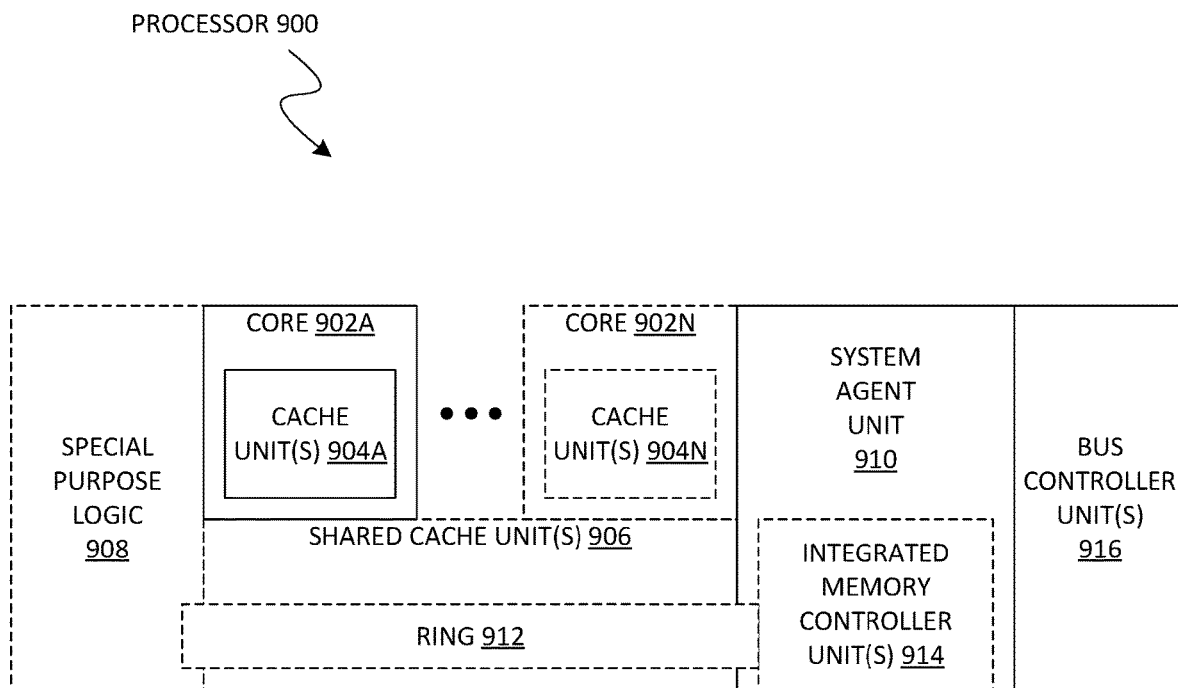
FIG. 9 is a block diagram of a processor that may have more than one core, may have an integrated memory controller, and may have integrated graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes respective one or more levels of caches 904A-N within cores 902A-N, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the special purpose logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the special purpose logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10 through 13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
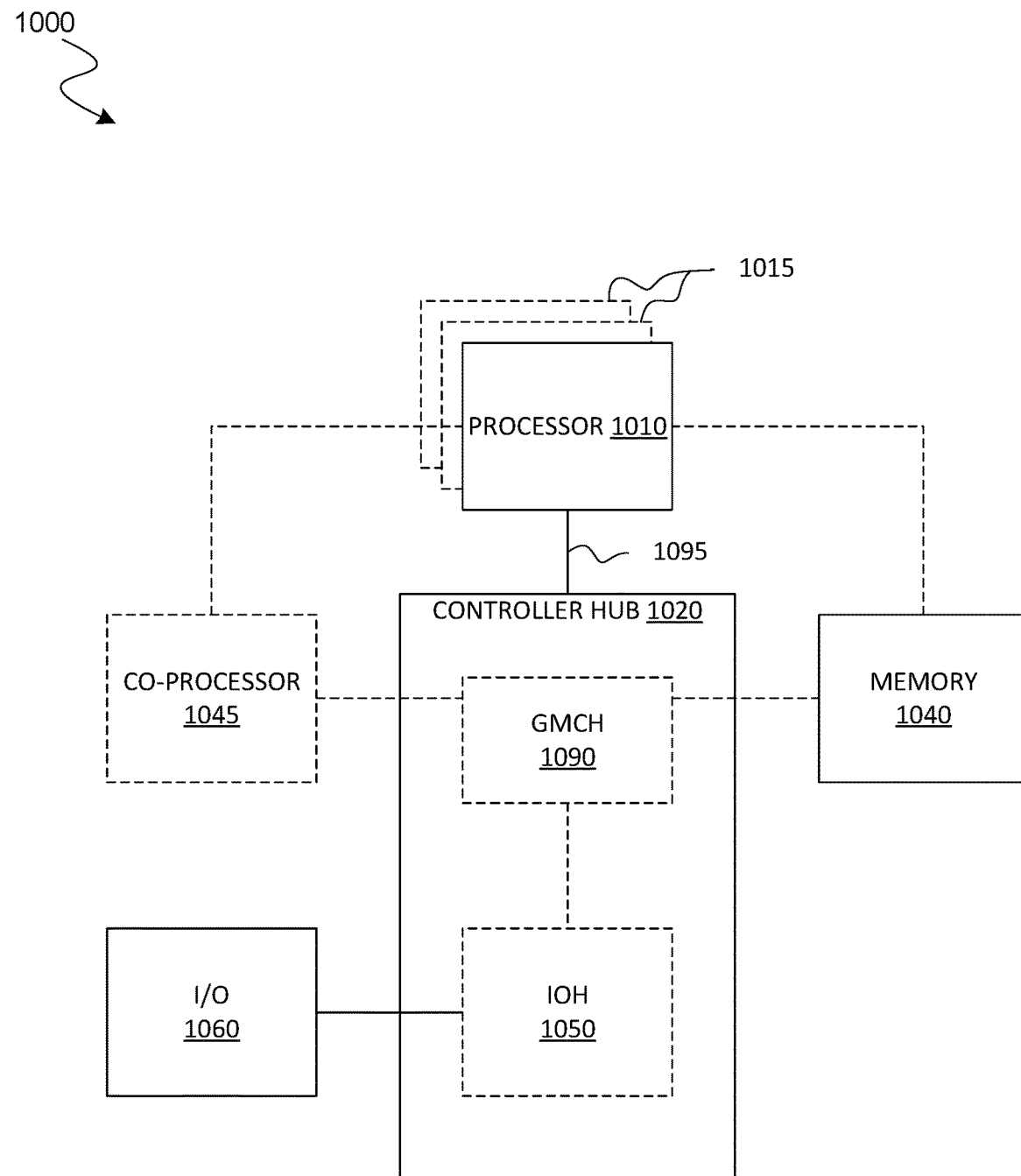
FIGS. 10 through 13 are block diagrams of exemplary computer architectures.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the processors 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
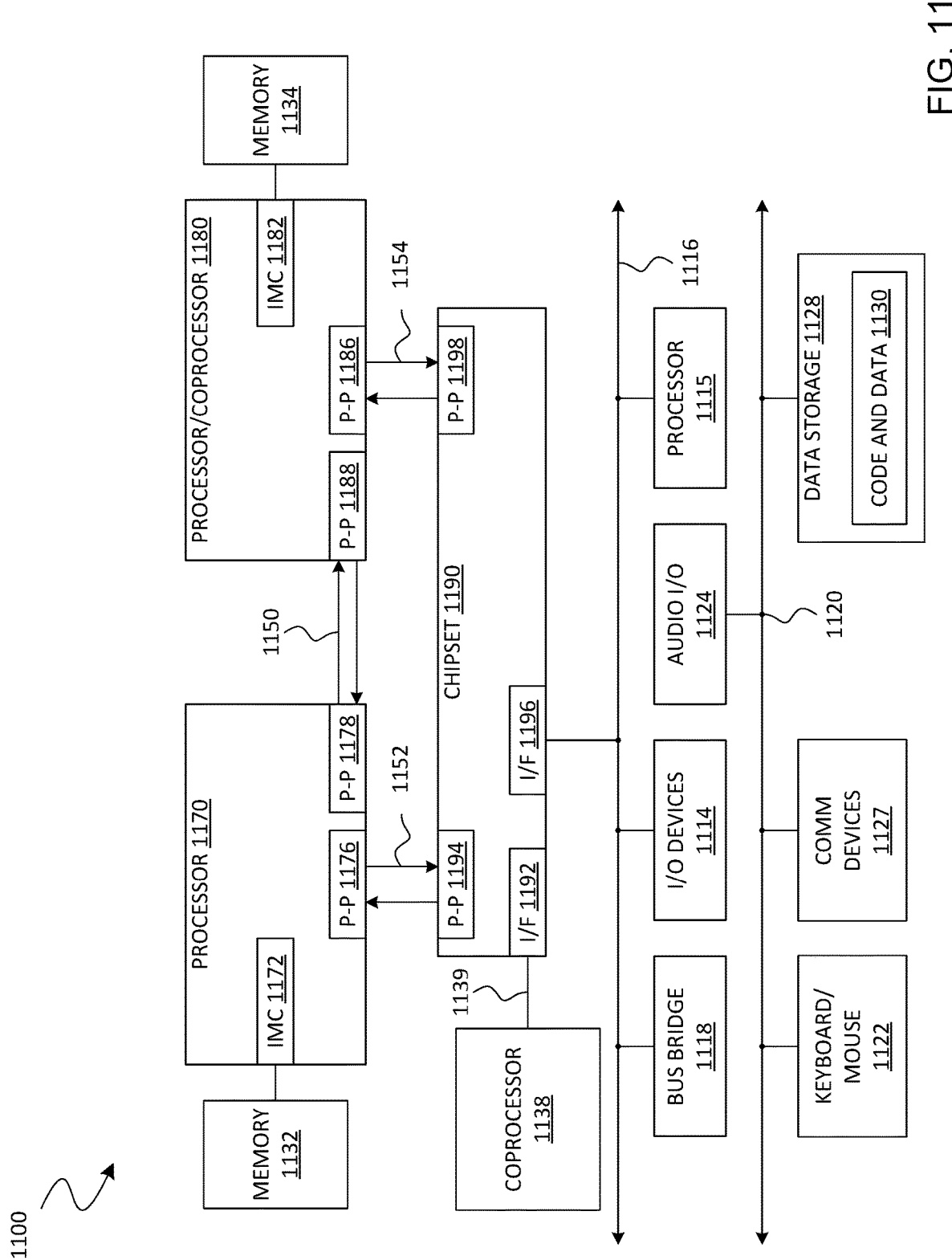

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller unit's point-to-point (P-P) interfaces 1176 and 1178; similarly, second processor 1180 includes P-P interfaces 1186 and 1188. Processors 1170, 1180 may exchange information via a point-to-point (P-P) interconnect 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1192 and an interconnect 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
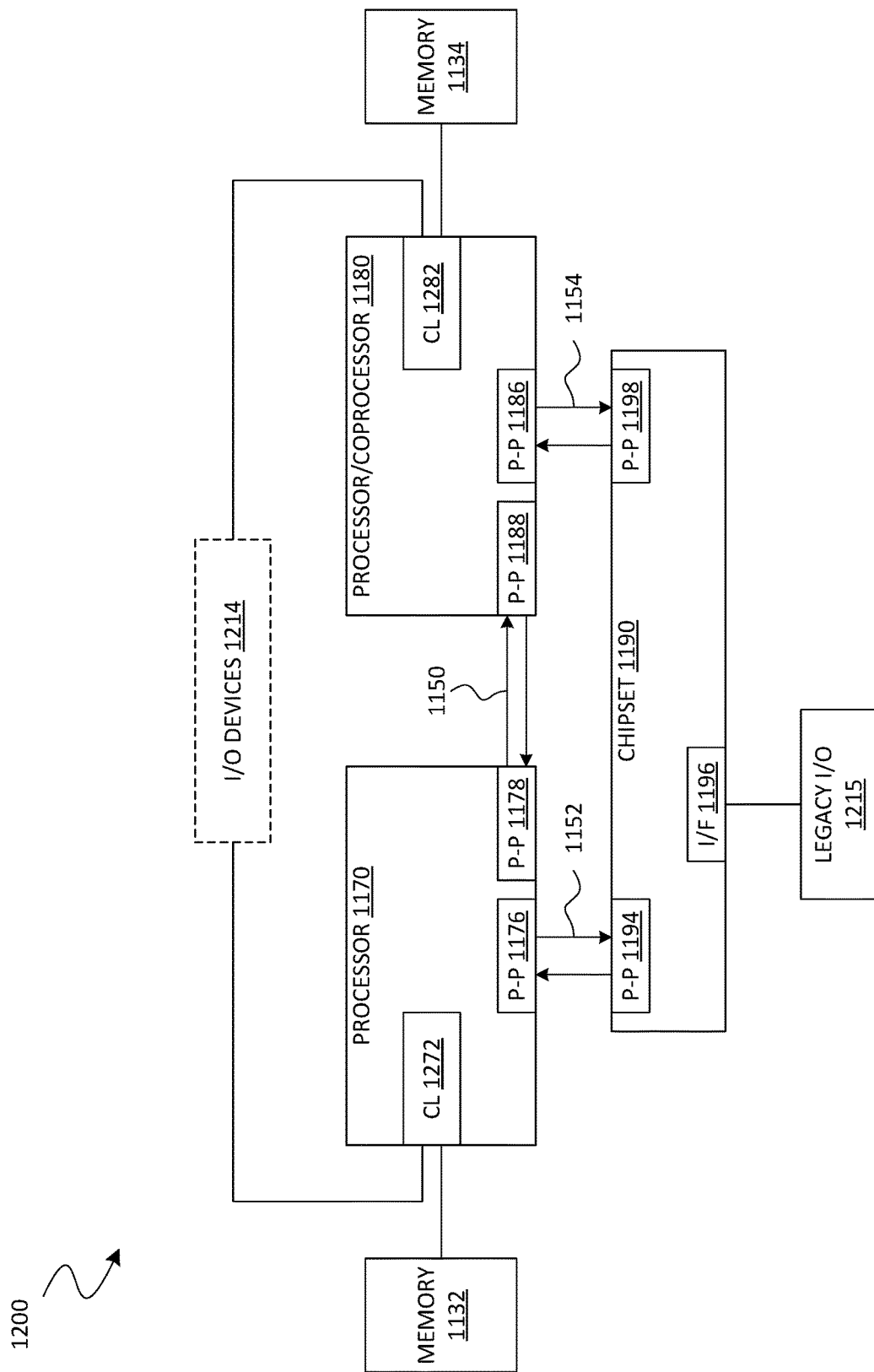

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1272 and 1282, respectively. Thus, the CL 1272, 1282 include integrated memory controller units and include I/O control logic. FIG. 12 illustrates that not only are the memories 1132, 1134 coupled to the CL 1272, 1282, but also that I/O devices 1214 are also coupled to the control logic 1272, 1282. Legacy I/O devices 1215 are coupled to the chipset 1190.

Figure 13:
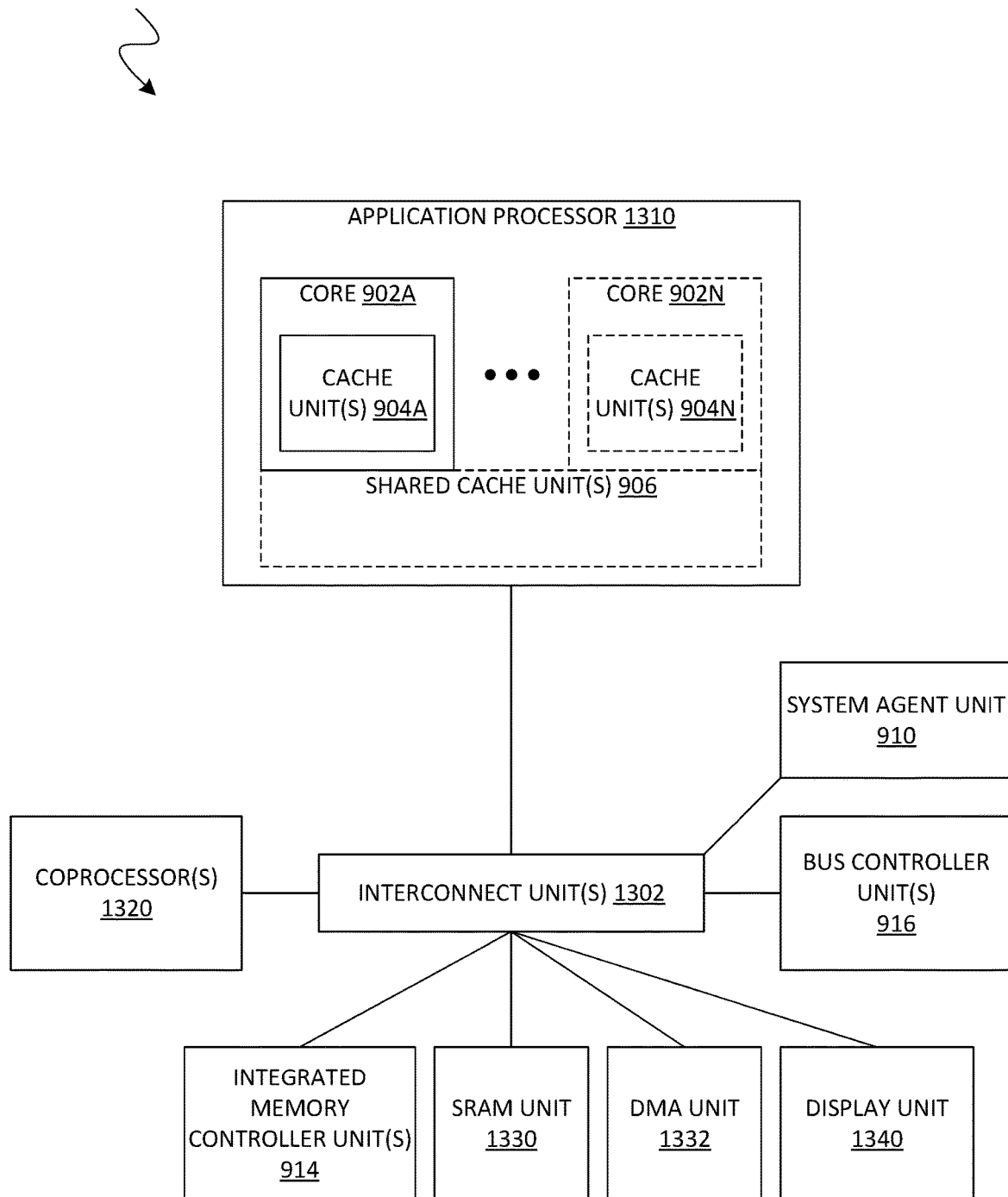

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 902A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
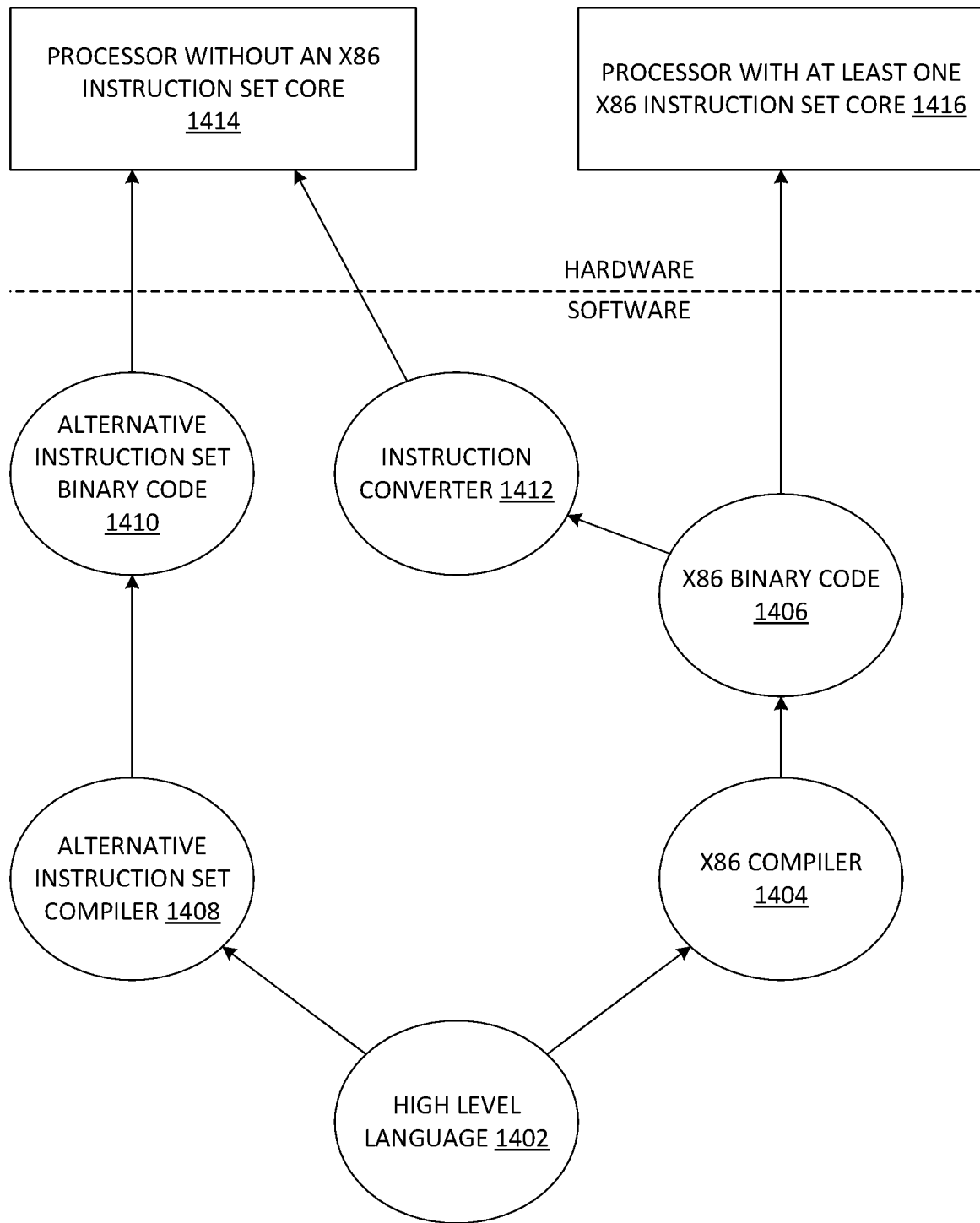
FIG. 14 is a block diagram contrasting the use of a software instruction converter to convert binary instructions in a source instruction set to binary instructions in a target instruction set according to embodiments of the invention.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

In one or more first embodiments, a processor comprises one or more first cores each of a first type which corresponds to a first level of power consumption, a plurality of second cores each of a second type which corresponds to a second level of power consumption which is less than the first level of power consumption, and power control unit circuitry to detect an inefficiency of a first operational mode of the processor, wherein the power control unit circuitry is to detect that during the inefficiency, an indication of an amount of power, to be available to the processor, would be below a threshold level, and generate a hint that the processor is to transition to a second operational mode based on the indication, wherein the hint is to indicate that the processor is to deactivate a first one or more cores of the processor according to a first prioritization of the first type over the second type, or that the processor is to activate a second one or more cores of the processor according to a second prioritization of the second type over the first type.

In one or more second embodiments, further to the first embodiment, the inefficiency is a first inefficiency, the hint is a first hint to indicate that the processor is to deactivate the first one or more cores according to the first prioritization, the power control unit circuitry is further to detect a second inefficiency of a third operational mode of the processor, the second inefficiency while the indication is to be above the threshold level, and generate a second hint that the processor is to transition to a fourth operational mode based on the second indication, wherein the second hint is to indicate that the processor is to activate another one or more cores according to the second prioritization.

In one or more third embodiments, further to the first embodiment, to detect the inefficiency comprises to detect a change of the indication to a first level from a second level which is greater than the first level, and wherein, based on the indication, the hint is to indicate that the processor is to deactivate the first one or more cores according to the first prioritization.

In one or more fourth embodiments, further to the third embodiment, the power control unit circuitry is to send the hint based both on the indication and on a condition wherein each of the second cores is in a respective active state, and at least one of the one or more first cores is in a respective active state, wherein the hint identifies one of the one or more first cores.

In one or more fifth embodiments, further to the fourth embodiment, based on the indication, the power control unit circuitry is to successively send first hints until a test condition is satisfied, or until each of the one or more first cores is in a respective inactive state, wherein the first hints each identify a respective one of the one or more first cores.

In one or more sixth embodiments, further to the fifth embodiment, based on the indication, the power control unit circuitry is further to successively send second hints until the test condition is satisfied, or until only one of the one or more first cores is in an active state, wherein the second hints each identify a respective one of the second cores.

In one or more seventh embodiments, further to the first embodiment, to detect the inefficiency comprises to detect a change of the indication to a first level from a second level which is less than the first level, and wherein, based on the indication, the hint is to indicate that the processor is to activate the second one or more cores according to the second prioritization.

In one or more eighth embodiments, further to the seventh embodiment, the power control unit circuitry is to send the hint based both on the indication and on a condition wherein each of the one or more first cores is in a respective inactive state while one of the second cores is in a respective inactive state, wherein the hint identifies the one of the second cores.

In one or more ninth embodiments, further to the eighth embodiment, based on the indication, the power control unit circuitry is to successively send first hints until a test condition is satisfied, or until each of the second cores is in a respective active state, wherein the first hints each identify a respective one of the second cores.

In one or more tenth embodiments, further to the ninth embodiment, based on the indication, the power control unit circuitry is further to successively send second hints until the test condition is satisfied, or until each of the one or more first cores is in an active state, wherein the second hints each identify a respective one of the one or more first cores.

In one or more eleventh embodiments, a method at a power control unit of a processor, the method comprises detecting an inefficiency of a first operational mode of the processor, comprising detecting that during the inefficiency, an indication of an amount of power, to be available to the processor, would be below a threshold level, wherein one or more first cores of the processor are each of a first type which corresponds to a first level of power consumption, and a plurality of second cores of the processor are each of a second type which corresponds to a second level of power consumption which is less than the first level of power consumption, generating a hint that the processor is to transition to a second operational mode based on the indication, wherein the hint indicates that the processor is to deactivate a first one or more cores of the processor according to a first prioritization of the first type over the second type, or that the processor is to activate a second one or more cores of the processor according to a second prioritization of the second type over the first type.

In one or more twelfth embodiments, further to the eleventh embodiment, the inefficiency is a first inefficiency, wherein the hint is a first hint which indicates that the processor is to deactivate the first one or more cores according to the first prioritization, the method further comprises detecting a second inefficiency of a third operational mode of the processor, the second inefficiency while the indication is to be above the threshold level, and generating a second hint that the processor is to transition to a fourth operational mode based on the second indication, wherein the second hint indicates that the processor is to activate another one or more cores according to the second prioritization.

In one or more thirteenth embodiments, further to the eleventh embodiment, detecting the inefficiency comprises detecting a change of the indication to a first level from a second level which is greater than the first level, and wherein, based on the indication, the hint is to indicate that the processor is to deactivate the first one or more cores according to the first prioritization.

In one or more fourteenth embodiments, further to the thirteenth embodiment, the power control unit sends the hint based both on the indication and on a condition wherein each of the second cores is in a respective active state, and at least one of the one or more first cores is in a respective active state, wherein the hint identifies one of the one or more first cores.

In one or more fifteenth embodiments, further to the fourteenth embodiment, based on the indication, the power control unit successively sends first hints until a test condition is satisfied, or until each of the one or more first cores is in a respective inactive state, wherein the first hints each identify a respective one of the one or more first cores.

In one or more sixteenth embodiments, further to the fifteenth embodiment, based on the indication, the power control unit further successively sends second hints until the test condition is satisfied, or until only one of the one or more first cores is in an active state, wherein the second hints each identify a respective one of the second cores.

In one or more seventeenth embodiments, further to the eleventh embodiment, to detect the inefficiency comprises to detect a change of the indication to a first level from a second level which is less than the first level, and wherein, based on the indication, the hint is to indicate that the processor is to activate the second one or more cores according to the second prioritization.

In one or more eighteenth embodiments, further to the seventeenth embodiment, the power control unit sends the hint based both on the indication and on a condition wherein each of the one or more first cores is in a respective inactive state while one of the second cores is in a respective inactive state, wherein the hint identifies the one of the second cores.

In one or more nineteenth embodiments, further to the eighteenth embodiment, based on the indication, the power control unit successively sends first hints until a test condition is satisfied, or until each of the second cores is in a respective active state, wherein the first hints each identify a respective one of the second cores.

In one or more twentieth embodiments, further to the nineteenth embodiment, based on the indication, the power control unit further successively sends second hints until the test condition is satisfied, or until each of the one or more first cores is in an active state, wherein the second hints each identify a respective one of the one or more first cores.

In one or more twenty-first embodiments, a system comprises a processor comprising one or more first cores each of a first type which corresponds to a first level of power consumption, a plurality of second cores each of a second type which corresponds to a second level of power consumption which is less than the first level of power consumption, and power control unit circuitry to detect an inefficiency of a first operational mode of the processor, wherein the power control unit circuitry is to detect that during the inefficiency, an indication of an amount of power, to be available to the processor, would be below a threshold level, and generate a hint that the processor is to transition to a second operational mode based on the indication, wherein the hint is to indicate that the processor is to deactivate a first one or more cores of the processor according to a first prioritization of the first type over the second type, or that the processor is to activate a second one or more cores of the processor according to a second prioritization of the second type over the first type, and a display device coupled to the processor, the display device to display an image based on a signal communicated with one of the one or more first cores or the plurality of second cores.

In one or more twenty-second embodiments, further to the twenty-first embodiment, the inefficiency is a first inefficiency, the hint is a first hint to indicate that the processor is to deactivate the first one or more cores according to the first prioritization, the power control unit circuitry is further to detect a second inefficiency of a third operational mode of the processor, the second inefficiency while the indication is to be above the threshold level, and generate a second hint that the processor is to transition to a fourth operational mode based on the second indication, wherein the second hint is to indicate that the processor is to activate another one or more cores according to the second prioritization.

In one or more twenty-third embodiments, further to the twenty-first embodiment, to detect the inefficiency comprises to detect a change of the indication to a first level from a second level which is greater than the first level, and wherein, based on the indication, the hint is to indicate that the processor is to deactivate the first one or more cores according to the first prioritization.

In one or more twenty-fourth embodiments, further to the twenty-third embodiment, the power control unit circuitry is to send the hint based both on the indication and on a condition wherein each of the second cores is in a respective active state, and at least one of the one or more first cores is in a respective active state, wherein the hint identifies one of the one or more first cores.

In one or more twenty-fifth embodiments, further to the twenty-fourth embodiment, based on the indication, the power control unit circuitry is to successively send first hints until a test condition is satisfied, or until each of the one or more first cores is in a respective inactive state, wherein the first hints each identify a respective one of the one or more first cores.

In one or more twenty-sixth embodiments, further to the twenty-fifth embodiment, based on the indication, the power control unit circuitry is further to successively send second hints until the test condition is satisfied, or until only one of the one or more first cores is in an active state, wherein the second hints each identify a respective one of the second cores.

In one or more twenty-seventh embodiments, further to the twenty-first embodiment, to detect the inefficiency comprises to detect a change of the indication to a first level from a second level which is less than the first level, and wherein, based on the indication, the hint is to indicate that the processor is to activate the second one or more cores according to the second prioritization.

In one or more twenty-eighth embodiments, further to the twenty-seventh embodiment, the power control unit circuitry is to send the hint based both on the indication and on a condition wherein each of the one or more first cores is in a respective inactive state while one of the second cores is in a respective inactive state, wherein the hint identifies the one of the second cores.

In one or more twenty-ninth embodiments, further to the twenty-eighth embodiment, based on the indication, the power control unit circuitry is to successively send first hints until a test condition is satisfied, or until each of the second cores is in a respective active state, wherein the first hints each identify a respective one of the second cores.

In one or more thirtieth embodiments, further to the twenty-ninth embodiment, based on the indication, the power control unit circuitry is further to successively send second hints until the test condition is satisfied, or until each of the one or more first cores is in an active state, wherein the second hints each identify a respective one of the one or more first cores.

Techniques and architectures for determining an operational mode of a multi-core processor are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A processor comprising:
   multiple cores comprising:
      one or more first cores each of a first type which corresponds to a first level of power consumption; and
      a plurality of second cores each of a second type which corresponds to a second level of power consumption which is less than the first level of power consumption; and
   power control unit circuitry coupled to the multiple cores, the power control unit circuitry to:
      detect an inefficiency of a first operational mode of the processor, wherein the power control unit circuitry is to detect that during the inefficiency, an indication of an amount of power, to be available to the processor, would be below a threshold level;
      perform an access of reference information based on the inefficiency, wherein the reference information is to indicate:
         a first prioritization of the first type over the second type with respect to removal from a pool of cores which are to be available each as a respective candidate to be selected by a thread scheduler process which is to be executed with the processor; and
         a second prioritization of the second type over the first type with respect to addition to the pool of cores;
      based on the access of the reference information, perform an identification of:
         a first one or more cores of the multiple cores according to the first prioritization; or
         a second one or more cores of the multiple cores according to the second prioritization; and
      based on the identification, communicate, to an operating system (OS) which is to be executed with the processor, a hint that the processor is to transition to a second operational mode, wherein:
         the hint is to indicate to the OS that the processor is to deactivate the first one or more cores, comprising the hint is to indicate to the OS that the first one or more cores are to be removed from the pool of cores; or
         the hint is to indicate to the OS that the processor is to activate the second one or more cores, comprising the hint is to indicate to the OS that the second one or more cores are to be added to the pool of cores.

2. The processor of claim 1, wherein:
   the inefficiency is a first inefficiency;
   the hint is a first hint to indicate to the OS that, according to the first prioritization, the first one or more cores are to be removed from the pool of cores; and
   the power control unit circuitry is further to:
      detect a second inefficiency of a third operational mode of the processor, the second inefficiency while the indication is to be above the threshold level; and
      communicate a second hint to indicate to the OS that the processor is to transition to a fourth operational mode based on the second indication, wherein the second hint is to indicate to the OS that the processor is to activate another one or more cores, comprising the second hint is to indicate to the OS that, according to the second prioritization, the other one or more cores are to be added to the pool of cores.

3. The processor of claim 1, wherein to detect the inefficiency comprises to detect a change of the indication to a third level from a fourth level which is greater than the third level, and wherein, based on the indication, the hint is to indicate to the OS that, according to the first prioritization, the first one or more cores are to be removed from the pool of cores.

4. The processor of claim 3, wherein the power control unit circuitry is to send the hint based both on the indication and on a condition wherein each of the second cores is in a respective active state, and at least one of the one or more first cores is in a respective active state, wherein the hint identifies one of the one or more first cores.

5. The processor of claim 4, wherein, based on the indication, the power control unit circuitry is to successively send first hints until a test condition is satisfied, or until each of the one or more first cores is in a respective inactive state, wherein the first hints each identify a respective one of the one or more first cores.

6. The processor of claim 5, wherein, based on the indication, the power control unit circuitry is further to successively send second hints until the test condition is satisfied, or until only one of the one or more first cores is in an active state, wherein the second hints each identify a respective one of the second cores.

7. The processor of claim 1, wherein to detect the inefficiency comprises to detect a change of the indication to a third level from a fourth level which is less than the third level, and wherein, based on the indication, the hint is to indicate to the OS that, according to the second prioritization, the second one or more cores are to be added to the pool of cores.

8. The processor of claim 7, wherein the power control unit circuitry is to send the hint based both on the indication and on a condition wherein each of the one or more first cores is in a respective inactive state while one of the second cores is in a respective inactive state, wherein the hint identifies the one of the second cores.

9. The processor of claim 8, wherein, based on the indication, the power control unit circuitry is to successively send first hints until a test condition is satisfied, or until each of the second cores is in a respective active state, wherein the first hints each identify a respective one of the second cores.

10. The processor of claim 9, wherein, based on the indication, the power control unit circuitry is further to successively send second hints until the test condition is satisfied, or until each of the one or more first cores is in an active state, wherein the second hints each identify a respective one of the one or more first cores.

11. A method at a power control unit of a processor, the method comprising:
   detecting an inefficiency of a first operational mode of the processor, comprising detecting that during the inefficiency, an indication of an amount of power, to be available to the processor, would be below a threshold level, wherein multiple cores of the processor comprise:
  one or more first cores each of a first type which corresponds to a first level of power consumption; and
  a plurality of second cores each of a second type which corresponds to a second level of power consumption which is less than the first level of power consumption;
performing an access of reference information based on the inefficiency, wherein the reference information indicates:
  a first prioritization of the first type over the second type with respect to removal from a pool of cores which are available each as a respective candidate to be selected by a thread scheduler process which is executed with the processor; and
  a second prioritization of the second type over the first type with respect to addition to the pool of cores;
based on the access of the reference information, performing an identification of:
  a first one or more cores of the multiple cores according to the first prioritization; or
  a second one or more cores of the multiple cores according to the second prioritization; and
based on the identification, communicating, to an operating system (OS) which is executed with the processor, a hint that the processor is to transition to a second operational mode, wherein:
  the hint indicates to the OS that the processor is to deactivate the first one or more cores, comprising the hint indicating that the first one or more cores are to be removed from the pool of cores; or
  the hint indicates to the OS that the processor is to activate the second one or more cores, comprising the hint indicating that the second one or more cores are to be added to the pool of cores.

12. The method of claim 11, wherein the inefficiency is a first inefficiency, and wherein the hint is a first hint which indicates that, according to the first prioritization, the first one or more cores are to be removed from the pool of cores, the method further comprising:
  detecting a second inefficiency of a third operational mode of the processor, the second inefficiency while the indication is to be above the threshold level; and
  communicating a second hint to indicate to the OS that the processor is to transition to a fourth operational mode based on the second indication, wherein the second hint indicates that the processor is to activate another one or more cores, comprising the second hint is to indicate to the OS that, according to the second prioritization, the other one or more cores are to be added to the pool of cores.

13. The method of claim 11, wherein detecting the inefficiency comprises detecting a change of the indication to a third level from a fourth level which is greater than the third level, and wherein, based on the indication, the hint is to indicate to the OS that, according to the first prioritization, the first one or more cores are to be removed from the pool of cores.

14. The method of claim 13, wherein the power control unit sends the hint based both on the indication and on a condition wherein each of the second cores is in a respective active state, and at least one of the one or more first cores is in a respective active state, wherein the hint identifies one of the one or more first cores.

15. The method of claim 14, wherein, based on the indication, the power control unit successively sends first hints until a test condition is satisfied, or until each of the one or more first cores is in a respective inactive state, wherein the first hints each identify a respective one of the one or more first cores.

16. The method of claim 11, wherein to detect the inefficiency comprises to detect a change of the indication to a third level from a fourth level which is less than the third level, and wherein, based on the indication, the hint is to indicate to the OS that, according to the second prioritization, the second one or more cores are to be added to the pool of cores.

17. A system comprising:
  a processor comprising:
    multiple cores comprising:
      one or more first cores each of a first type which corresponds to a first level of power consumption; and
      a plurality of second cores each of a second type which corresponds to a second level of power consumption which is less than the first level of power consumption; and
    power control unit circuitry coupled to the multiple cores, the power control unit circuitry to:
      detect an inefficiency of a first operational mode of the processor, wherein the power control unit circuitry is to detect that during the inefficiency, an indication of an amount of power, to be available to the processor, would be below a threshold level;
      perform an access of reference information based on the inefficiency, wherein the reference information is to indicate:
        a first prioritization of the first type over the second type with respect to removal from a pool of cores which are to be available each as a respective candidate to be selected by a thread scheduler process which is to be executed with the processor; and
        a second prioritization of the second type over the first type with respect to addition to the pool of cores;
      based on the access of the reference information, perform an identification of:
        a first one or more cores of the multiple cores according to the first prioritization; or
        a second one or more cores of the multiple cores according to the second prioritization; and
      based on the identification, communicate, to an operating system (OS) which is to be executed with the processor, a hint that the processor is to transition to a second operational mode, wherein:
        the hint is to indicate to the OS that the processor is to deactivate the first one or more cores, comprising the hint is to indicate to the OS that the first one or more cores are to be removed from the pool of cores; or
        the hint is to indicate to the OS that the processor is to activate the second one or more cores, comprising the hint is to indicate to the OS that the second one or more cores are to be added to the pool of cores; and
  a display device coupled to the processor, the display device to display an image based on a signal communicated with one of the one or more first cores or the plurality of second cores.

18. The system of claim 17, wherein:
the inefficiency is a first inefficiency;
the hint is a first hint to indicate to the OS that, according to the first prioritization, the first one or more cores are to be removed from the pool of cores;
the power control unit circuitry is further to:
   detect a second inefficiency of a third operational mode of the processor, the second inefficiency while the indication is to be above the threshold level; and
   generate a second hint to indicate to the OS that the processor is to transition to a fourth operational mode based on the second indication, wherein the second hint is to indicate to the OS that the processor is to activate another one or more cores, comprising the second hint is to indicate to the OS that, according to the second prioritization, the other one or more cores are to be added to the pool of cores.

19. The system of claim 17, wherein to detect the inefficiency comprises to detect a change of the indication to a third level from a fourth level which is greater than the third level, and wherein, based on the indication, the hint is to indicate to the OS that, according to the first prioritization, the first one or more cores are to be removed from the pool of cores.

20. The system of claim 17, wherein to detect the inefficiency comprises to detect a change of the indication to a third level from a fourth level which is less than the third level, and wherein, based on the indication, the hint is to indicate to the OS that, according to the second prioritization, the second one or more cores are to be added to the pool of cores.

* * * * *